United States Patent
Miller et al.

(10) Patent No.: US 9,049,595 B2
(45) Date of Patent: Jun. 2, 2015

(54) PROVIDING UBIQUITOUS WIRELESS CONNECTIVITY AND A MARKETPLACE FOR EXCHANGING WIRELESS CONNECTIVITY USING A CONNECTIVITY EXCHANGE

(75) Inventors: Marc Collins Miller, Fall City, WA (US); Victoria Marie Poncini, Renton, WA (US); Derek Leon Harris, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 559 days.

(21) Appl. No.: 12/332,363

(22) Filed: Dec. 11, 2008

(65) Prior Publication Data
US 2010/0151818 A1    Jun. 17, 2010

(51) Int. Cl.
| | |
|---|---|
| G06F 7/04 | (2006.01) |
| H04W 12/06 | (2009.01) |
| G06Q 50/18 | (2012.01) |
| H04L 29/06 | (2006.01) |
| H04W 28/16 | (2009.01) |

(52) U.S. Cl.
CPC ............ *H04W 12/06* (2013.01); *G06Q 50/188* (2013.01); *H04L 63/0815* (2013.01); *H04W 28/16* (2013.01)

(58) Field of Classification Search
USPC ............................................. 726/2–7, 10, 21
See application file for complete search history.

(56) References Cited

U.S. PATENT DOCUMENTS

| | | | |
|---|---|---|---|
| 5,802,502 | A | 9/1998 | Gell et al. |
| 6,151,309 | A | 11/2000 | Busuioc et al. |
| 6,621,895 | B1 | 9/2003 | Giese |
| 7,158,506 | B2 | 1/2007 | Jacobs et al. |
| 7,227,529 | B2 | 6/2007 | Suomela |
| 7,302,256 | B1* | 11/2007 | O'Hara et al. ............... 455/418 |
| 7,340,048 | B2 | 3/2008 | Stern et al. |
| 7,392,035 | B2 | 6/2008 | Rahman et al. |
| 2003/0028805 | A1 | 2/2003 | Lahteenmaki |
| 2003/0100308 | A1 | 5/2003 | Rusch |
| 2004/0233868 | A1* | 11/2004 | Farnham ....................... 370/329 |
| 2005/0283447 | A1 | 12/2005 | Xu et al. |

(Continued)

FOREIGN PATENT DOCUMENTS

| | | |
|---|---|---|
| CN | 1496659 A | 5/2004 |
| CN | 1564516 A | 1/2005 |

(Continued)

OTHER PUBLICATIONS

Rigney et al., "Remote Authentication Dial in User Service (RADIUS)," RFC 2865, Network Working Group, Jun. 2000, 15 pages.*

(Continued)

*Primary Examiner* — Mohammad A Siddiqi
(74) *Attorney, Agent, or Firm* — Brandon Roper; David Andrews; Micky Minhas

(57) ABSTRACT

Various implementations are described herein for using a connectivity exchange to provide ubiquitous wireless connectivity and a marketplace for exchanging wireless connectivity. Wireless service providers join the connectivity exchange and enable users to access the Internet using their wireless connectivity via the connectivity exchange. Users are authenticated via the exchange and rates and terms for users to access the Internet are negotiated. General service providers provide services via the exchange.

16 Claims, 11 Drawing Sheets

(56) References Cited

U.S. PATENT DOCUMENTS

| | | | |
|---|---|---|---|
| 2006/0075103 A1* | 4/2006 | Cromer et al. | 709/225 |
| 2006/0165103 A1* | 7/2006 | Trudeau et al. | 370/401 |
| 2007/0076665 A1 | 4/2007 | Nair et al. | |
| 2007/0076729 A1 | 4/2007 | Takeda | |
| 2007/0180088 A1 | 8/2007 | Zhao | |
| 2008/0040481 A1 | 2/2008 | Joshi et al. | |
| 2008/0069047 A1 | 3/2008 | Yee et al. | |
| 2008/0089295 A1* | 4/2008 | Keeler et al. | 370/332 |

FOREIGN PATENT DOCUMENTS

| | | |
|---|---|---|
| CN | 1852193 A | 10/2006 |
| CN | 1913475 A | 2/2007 |
| CN | 101018175 A | 8/2007 |
| JP | 2000-22758 A | 1/2000 |
| JP | 2001-195451 A | 7/2001 |
| JP | 2006-295945 A | 10/2006 |
| TW | 200527249 A | 8/2005 |
| TW | 200623764 A | 7/2006 |
| WO | 02073993 A1 | 9/2002 |
| WO | 2008035161 A2 | 3/2008 |

OTHER PUBLICATIONS

Formby, Kevin, "Low Latency Exchange Connectivity", Retrieved at <<http://www.exchange-handbook.co.uk/index.cfm?section=articles&action=detail&id=60614>>, Jul. 7, 2008, pp. 4.

"Enterasys Secure Networks", Retrieved at <<http://www.enterasys.com/products/security-enabled-infrastructure/xsr-series.aspx>>, Jul. 7, 2008, pp. 2.

"Toshiba", Retrieved at <<http://www.toshiba-europe.com/leadinginnovation/plain/about.asp?feature=connect&id=easy_gaurd>>, Jul. 7, 2008, p. 1.

"Oracle", Retrieved at <<http://edocs.bea.com/wlp/docs92/compoze/setup_guide_30/exchange.html>>, Jul. 7, 2008, pp. 3.

Siddiqui, et al., "Ubiquitous Wireless Connectivity across Cellular and Wireless Local Area Networks", Retrieved at <<http://www.iis.sinica.edu.tw/page/jise/2008/200803_01.pdf>>, Journal of Information Science and Engineering 24, 2008, pp. 327-342.

"Wireless Internet Access Services Providers", Retrieved at <<http://www.bbwexchange.com/wireless_internet_access/index.asp#wirelessinternetaccessubiquitouscoverage>>, Jul. 2, 2008, pp. 11.

Johnson, Eric E., "HF Radio in the International Information Infrastructure", Retrieved at <<http://wireless.nmsu.edu/hf/papers/internet.pdf>>, Proceedings of HF 1995, Nordic Shortwave Radio Conference, Faro, Sweden, pp. 19.

Handorean, et al., "Secure Service Provision in Ad Hoc Networks", Retrieved at <<http://mobilab.wustl.edu/Publications/Papers/2003/03-47%20(Secure%20Service%20Provision)%20ICSOC%202003.pdf>>, pp. 17.

"International Search Report", Mailed Date: Jul. 1, 2010, Application No. PCT/US2009/065316, Filed Date: Nov. 20, 2009, pp. 9.

"Exchange Connectivity" brochure, Retrieved at <<http://www.tradingtechnologies.com/back-office-bridge>>, copyright 2007-2011, pp. 2.

Gross et al., "Requirements and Technologies for Ubiquitous Payment", Retrieved at <<http://www.vs.inf.ethz.ch/res/papers/MKWI_UPayment.pdf>> Mar. 2004, pp. 1-12.

McKnight et al., "Virtual Markets in Wireless Grids", Retrieved <http://people.csail.mit.edu/ozlem/tprc-wirelessGrid-uzuner.PDF>> TRPC 30th Research Conference on Communication, Information and Internet Policy, Sep. 28-30, 2002, pp. 1-22.

Chinese Patent Application No. 200980150333: Ofice Action dated Jun. 6, 2013, 3 pages.

Japanese Patent Application No. 2011-540761: Office Action dated May 14, 2013, 3 pages.

"Third Office Action Issued in Chinese Patent Application No. 200980150333.X", Mailed Date: Oct. 28, 2013, Filed Date: Nov. 20, 2009, 7 Pages.

"Notice of Allowance Issued in Japanese Patent Application No. 2011-540761", Mailed Date: Dec. 17, 2013, Filed Date: Nov. 20, 2009, 3 Pages. (w/o English Translation).

* cited by examiner

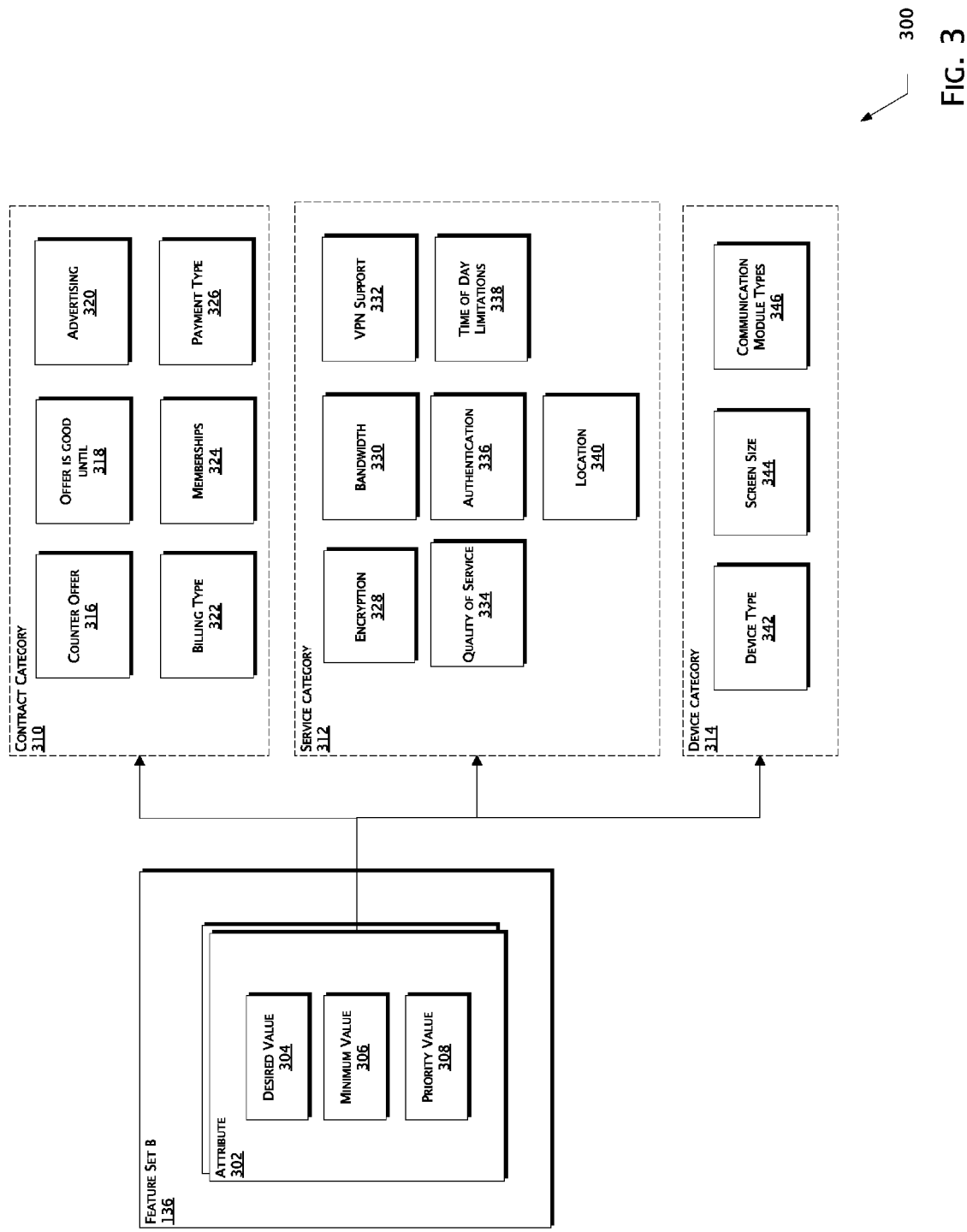

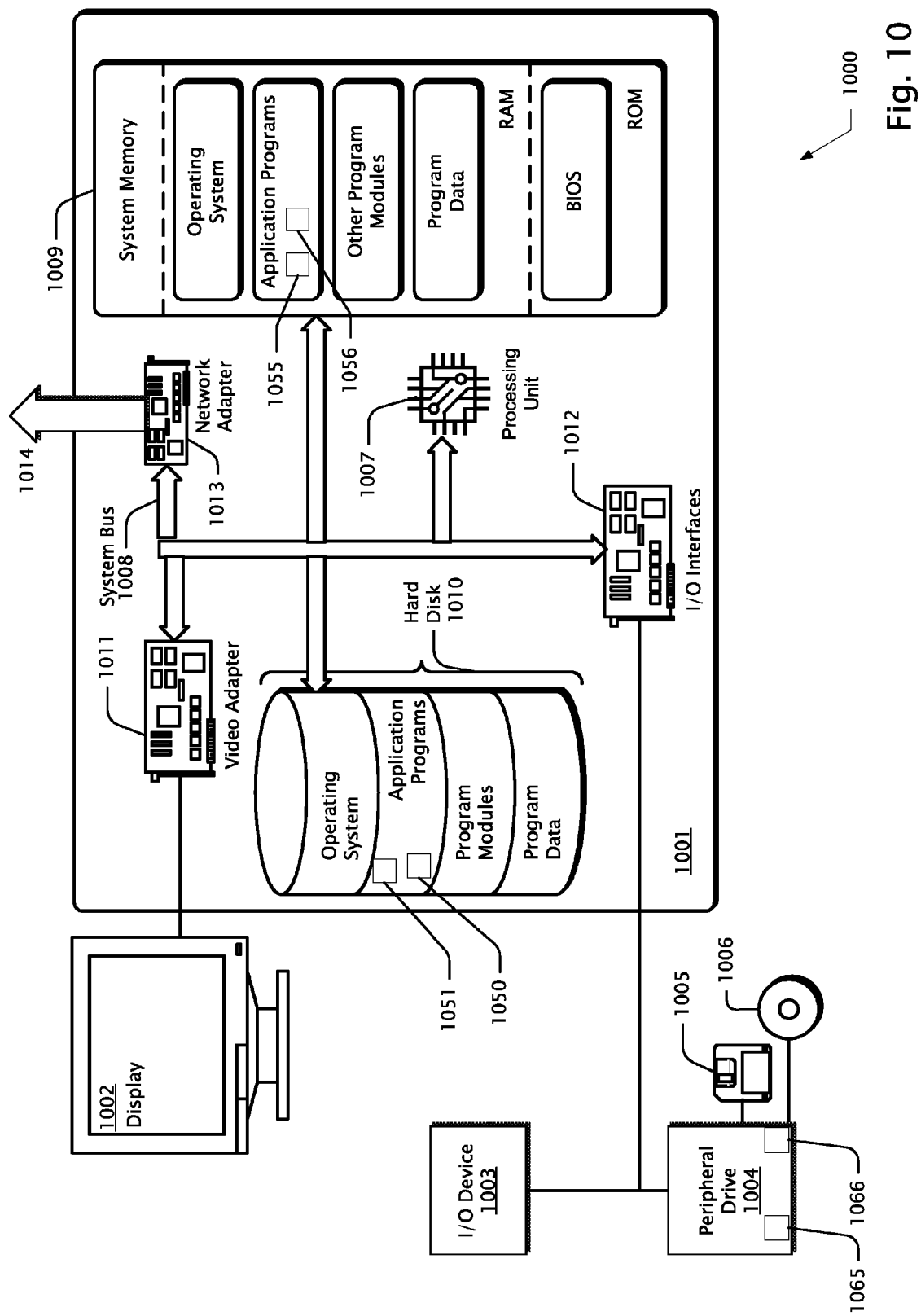

PROVIDING UBIQUITOUS WIRELESS CONNECTIVITY AND A MARKETPLACE FOR EXCHANGING WIRELESS CONNECTIVITY USING A CONNECTIVITY EXCHANGE

RELATED APPLICATIONS

U.S. patent application Ser. No. 12/332,365 filed Dec. 11, 2008, now U.S. Pat. No. 8,683,073, granted on Mar. 25, 2014, entitled "PARTICIPATING WITH AND ACCESSING A CONNECTIVITY EXCHANGE" that is assigned to the assignee of the present patent application is related to the present patent application and is hereby incorporated by reference.

BACKGROUND

People typically connect their wireless computing devices to the Internet via wireless hotspots. They create an account recognized by the wireless hotspot and pay for wireless connectivity using a credit card. Because of increasing demand for wireless connectivity, the number of wireless vendors offering wireless service has increased. Further, improvements in hardware and software have led to the development of technologies such as WiMaX™ that provide users with alternate wireless transmission protocols to wirelessly access the Internet. However, the process that people follow to use these technologies remains unimproved.

SUMMARY

The following presents a simplified summary of the disclosure to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are implementations that provide users with ubiquitous wireless connectivity to the Internet using a connectivity exchange ("exchange"). The exchange is a service that allows users to seamlessly access the Internet through various wireless service providers ("WSPs") by enabling WSPs to authenticate the users using user accounts at one or more account service providers ("ASPs") associated with the users or enabling users to agree to terms and conditions of WSPs and/or general service providers ("GSPs") to allow access. Using a computing device, users access the Internet via the exchange by providing user credentials to WSPs offering wireless connectivity. Examples of WSPs include but are not limited to T-Mobile™ Hotspots, Verizon™ cell phone networks, Clearwire coverage areas and so forth. WSPs authenticate users via the exchange and grant users access to the Internet. WSPs may also authenticate users directly with their account providers. Computing devices that include one or more communication modules for transmitting on one or more wireless transmission protocols may seamlessly transition between WSPs that offer wireless connectivity via different wireless transmission protocols. Further, in the below described implementations, the exchange allows WSPs, ASPs and GSPs (collectively referred to as "service providers") to exchange feature sets and negotiate rates for accessing the Internet based on features sets. An ASP is a type of GSP. Rates may be pre-negotiated or dynamically negotiated. Service providers and/or users may negotiate rates directly with each other, via the exchange or using variations of the like. Rates may include cost for the service, the exchange of services and/or the acceptance of terms for usage such as agreeing to advertising, logging of usage and so forth.

Many of the attendant features will be readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 3 illustrates an example implementation of a feature set.

FIG. 10 illustrates an example computing environment in which the various technologies described herein may be implemented.

DETAILED DESCRIPTION

Overview

Figure 1:
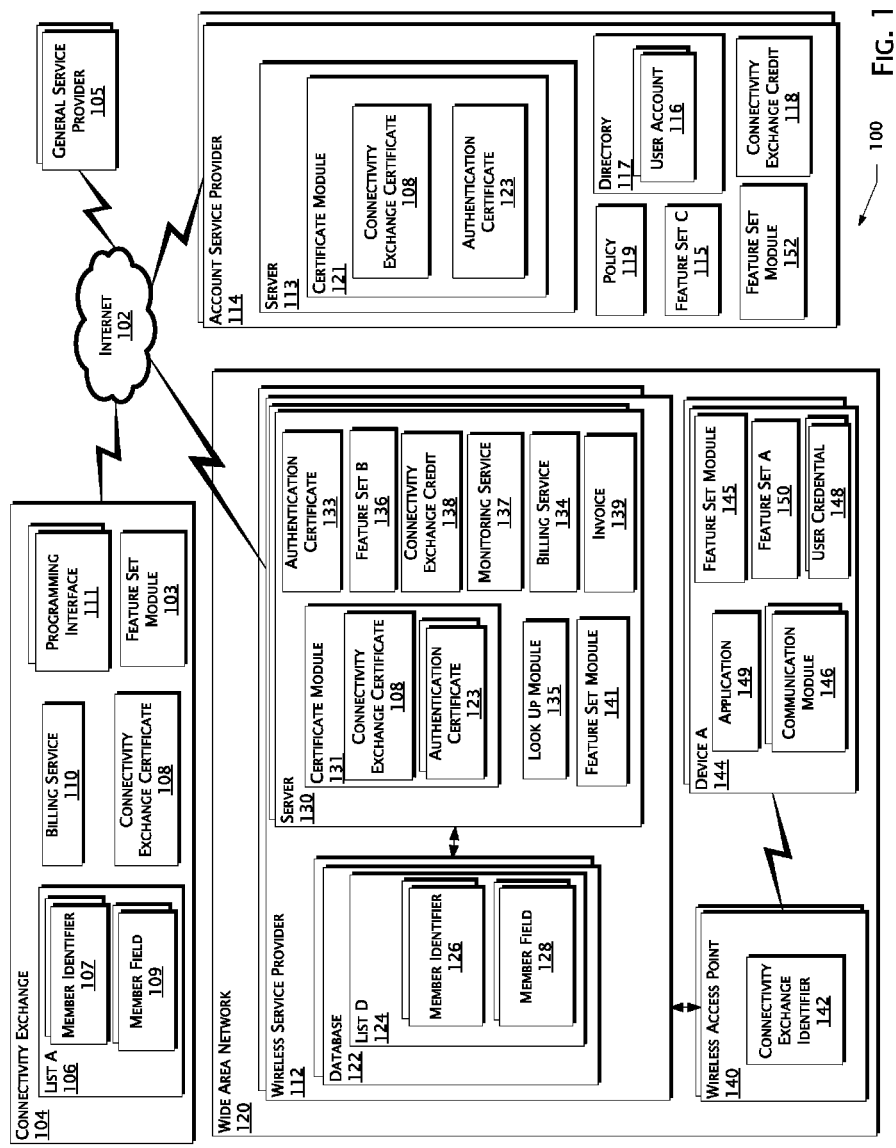
FIG. 1 illustrates an example environment for a user to access the Internet via an exchange.

The detailed description below describes implementations for providing users with ubiquitous wireless connectivity using an exchange. The exchange and/or WSPs grant users access to the Internet by authenticating credentials provided by the users. These credentials may be provided by the user or by a service for storing and retrieving them. Examples of user credentials include but are not limited to any one or more or combinations of usernames and passwords, smartcards, infocards, credit card numbers, pin numbers, telephone numbers, fingerprints, retinas and so forth. Further, these user credentials may be stored in any appropriate manner, including on a local computing device, on a remote computing device, or on external storage medium such as a flash drive, and the like.

The exchange authenticates and grants users access to the Internet by using user credentials that correspond to a user account associated with the exchange and/or service providers. For example, the exchange may allow a user to create an exchange user account managed by the exchange so that a WSP may authenticate the user. The exchange user account may include username/password, credit card information, home address, employment information, telephone numbers, email addresses, and so forth. This information may be accessed for negotiating rates. Users may also link other user accounts associated with different services to their exchange user accounts. Examples of user accounts that may be linked to exchange user accounts include but are not limited to social networking accounts, email accounts, and so forth.

The exchange may also authenticate a user using a user account associated with an ASP. Note that an ASP is a type of GSP. An ASP's membership in the exchange enables its users who have ASP accounts (and not necessarily an exchange administered user account) to access the Internet via the exchange. For example, ASPs may allow their users to be authenticated via the exchange by enabling the exchange to communicate with their directory services such as Microsoft® Active Directory® and the like. Consider a corporation that would like its employees to have ubiquitous wireless connectivity during business travel or a university that would like its students to have ubiquitous wireless connectivity on and off campus and so forth.

For users who do not have an ASP that negotiates rates on their behalf, the WSP may not require authentication if the users agree to other terms and/or conditions. For example, users may choose to accept an offer by a GSP or a WSP to pay for their Internet connection in return for accepting terms of usage including but not limited to advertising, tracking their usage, and so forth.

To service many users, the exchange includes one or more WSPs. WSPs provide wireless connectivity for users and initiate authentication of users via the exchange. Wireless connectivity may be provided using one or more wireless transmission protocols including but not limited to IEEE 802.11, WiMaX™ (IEEE 802.16), Enhanced Data Rates for GSM Evolution (EDGE), High-Speed Downlink Packet Access (HSDPA), and so forth. WSPs may use local authentication services such as Captive Portal, 802.1x, RADIUS (Remote Authentication Dial In User Service), and so forth, for authenticating users locally before sending requests to the exchange. Examples of WSPs include but are not limited to cell phone companies providing users access to the Internet via a cell phone network, individuals providing users access to the Internet via an 802.11-complaint wireless router connected to either a DSL (Digital Subscriber Line) connection or cable modem connection and so forth. For example, Verizon™ may be a WSP providing wireless connectivity to users via its cell phone network. Further, Verizon™ may be an ASP and enable Verizon™ employees to have access to the exchange via their Verizon™ employee accounts (user accounts).

The exchange authenticates service providers. For example, when a WSP joins the exchange, it receives a connectivity exchange certificate ("exchange certificate"). Requests that are sent to the exchange are validated using the exchange certificate to determine if requestors are valid members of the exchange. A successful validation indicates that the requesting party is a valid member of the exchange. GSPs and ASPs may also receive an exchange certificate when they join the exchange. Note that the exchange may use various types of authentication such as protocols, x.509 certificates, smart cards, cryptographic devices, software modules running on the WSP, text files, and so forth. Further, the exchange may use one or more different types of authentication.

WSPs also receive a connectivity exchange identifier ("exchange identifier") for broadcasting to user computing devices via a wireless access point. Exchange identifiers include but are not limited to SSIDs (Service Set Identifiers), IP (Internet Protocol) addresses, MAC (Media Access Control) addresses, E.164 addresses, service provider identifiers, SIDs (Service Identifiers), and so forth. For example, an exchange identifier may be an IP address or URL (Uniform Resource Locator) that is registered via a domain registry service that is universally recognized by users. Examples of wireless access points include 802.11-compliant wireless access points, cell phone towers, specialized radios, and so forth.

The exchange includes a list of WSP members, ASP members, and/or GSP members. The list also includes member identifiers and corresponding member information for each member stored in member fields. Examples of member identifiers include unique names that are associated with a WSP, an ASP or a GSP such as company name, assigned alphanumeric identifiers and so forth. Examples of member fields include but are not limited to URLs, certificates, feature sets, and so forth. The list may be stored in a text file, a database, in memory, and may be located on one or more computing devices in one or more locations. Further, corresponding member information may be stored independent of the list. For example, the list may include a pointer (path name) that corresponds to a location where a both a feature set and a certificate corresponding to an ASP are stored for access.

Using the list, the exchange routes requests for access to the appropriate ASP and/or GSP. For example, when a user requests access to the Internet via a WSP, the exchange authenticates the user via the exchange. Using the list, the exchange determines the appropriate ASP to authenticate the user and forwards the request to the selected ASP. Note that a WSP may authenticate a user directly with a corresponding ASP by accessing a local list, if appropriate.

Feature sets, a type of member information either stored in a list or accessible via a list, include descriptions of services offered by service providers. Service providers and users negotiate rates for access to the Internet via the exchange. For example, Microsoft® Corporation may be an ASP and a member of the exchange. Verizon™ may be a WSP and a member of the exchange. Microsoft® Corporation may agree to pay Verizon™ a fixed amount of money for each Microsoft® employee who accesses the Internet using the Verizon™ wireless network. Using feature sets, Microsoft® Corporation and Verizon™ exchange information about services preferred and services available and negotiate a rate that is acceptable to both parties. Negotiated rates may be fixed rates based on one or more feature set attributes included in a feature set, dynamic rates based on or one or more attributes included in a feature set, or variations of the like. Feature sets include one or more feature set attributes including but not limited to QoS (quality of service), bandwidth, security, and so forth. Note that rates may be pre-negotiated between ASPs and WSPs or they may be dynamically negotiated between each other or the exchange. Further, competing offers and counter offers are allowed for providing users and service providers with multiple options.

After rates are negotiated, service providers and/or users agree to a unit of measurement based on an agreed rate. This unit of measurement, referred to as a connectivity credit, is used for monitoring and billing purposes. WSPs include monitoring services for tracking user connections based on the agreed connectivity credit and for invoicing. The exchange may also include a billing service for generating and sending invoices. Further, the exchange facilitates the payment for the services between WSPs and ASPs. Note that billing services may be hosted by WSPs and/or GSPs separately from the exchange or via 3rd party service providers that are not members of the exchange.

General Environment

FIG. 1 illustrates an example implementation of a user connecting to a WSP to access the Internet via an exchange. The implementation in FIG. 1 has been deliberately expanded to illustrate various aspects that are possible with the instant disclosure. Not all of the elements illustrated in FIG. 1 are required in every embodiment and the various elements may be put together in different ways to implement different systems.

FIG. 1 illustrates an example environment 100, which includes Device A 144. Device A 144 represents user computing devices that are used to access the Internet 102 via exchange 104. Examples of computing devices include but are not limited to microprocessor-based systems, multiprocessor systems, set-top boxes, gaming consoles, hand-held devices, cell phones, consumer electronics, robots and so forth. Environment 100 also includes WSP 112, which provides wireless connectivity via wireless access point 140. WSP 112 is operatively connected to the Internet 102 and allows users to access the Internet 102 via exchange 104. As illustrated in FIG. 1, environment 100 also includes ASP 114 and GSP 105, which are used by WSP 112 for authentication, requirements for connection, and/or negotiation of rates. Both ASP 114 and GSP 105 are operatively connected to the Internet 102.

Connectivity Exchange

Exchange 104 is a system that provides ubiquitous wireless connectivity to users by allowing WSPs to make their wireless connectivity available to users and by allowing WSPs to authenticate users before granting access to the Internet. Exchange 104 enables WSPs to monetize their wireless connectivity by allowing ASPs, GSPs and users to negotiate rates for allowing users to access the Internet 102 using feature sets A 150, B 136 and C 115, creating a marketplace for exchanging and consuming ubiquitous wireless connectivity. The various scenarios for users to access the Internet via the exchange may include one or more different parties involved in the negotiation process. For example, an ASP may negotiate a rate for a user to access the Internet via the exchange without user input. Further details of an implementation of an ASP negotiating a rate for a user will be discussed in FIG. 7. Another example may include a user negotiating a rate for access to the Internet without using an ASP. Details of an implementation of a user negotiating a rate for access without an ASP will be discussed in FIG. 6. These examples and variations of the like are supported by the instant disclosure.

Exchange 104 may be implemented as a centralized system, a decentralized system, or a variation of the like. Typically, a centralized system includes a central service including one or more servers that manage access to the system, maintain connections of other subordinate connected systems, communicate with the other subordinate connected systems including but not limited to facilitating requests and sending updates. Subordinate connected systems include one or more servers operatively connected to the central service. Examples of architecture types for centralized systems include but are not limited to client/server, hub and spoke and variations of the like. For example, the central service may be running on one or more global servers. Subordinate systems may be one or more regional servers operatively connected to the global servers via the Internet. One or more local servers may be operatively connected to the subordinate servers via the Internet. Further, this variation of both a client/server and hub and spoke model may be preferred to allow the exchange to scale to accommodate large numbers of users and service providers. The exchange may be deployed in a data center such as a Microsoft® Corporation data center to accommodate high volumes of requests and provide high fidelity access and bandwidth.

A decentralized system typically does not include a central service and may allow one or more servers to operate independently. P2P (peer-to-peer) is an example architecture of a decentralized system.

In FIG. 1, exchange 104 is a centralized system using a variation of client/server and hub and spoke architectures. Further details about the implementation of exchange 104 will be discussed in FIG. 2. Note that exchange 104 could be implemented in a decentralized system.

Exchange 104 includes exchange certificate 108 for distributing to service providers. Using exchange certificate 108, exchange 104 validates request from WSPs, ASPs and GSPs. However, in embodiments where certificates are not desired or not available, the ability to validate members of the exchange should be included. In an alternate implementation, the exchange may use software executing on member servers to validate members of the exchange by exchanging text files, encrypted keys, and so forth. In another alternate implementation, hardware devices attached to member servers may be used by the exchange to validate members of the exchange.

Exchange 104 includes list A 106 for maintaining one or more identifiers 107 and one or more fields 109 for storing member information associated with exchange members. When processing a request for authentication, exchange 104 uses list A 106 to determine the appropriate ASP and/or GSP to forward the authentication request to, if appropriate. List A 106 includes one or more member identifiers 107, each member identifier having one or more corresponding member fields 109.

Exchange 104 uses list A 106 to facilitate dynamic negotiations of rates between WSPs, ASPs, GSPs and/or users.

Feature sets are used by service providers and users to negotiate rates. Feature set modules send and receive feature sets and process them. WSP 112, connectivity exchange 104, ASP 114 and Device A 144 include feature set modules 141, 103, 152, and 145, respectively.

Programming interfaces are supported by exchanges to allow software developers to include exchange services in their software applications, web applications, and the like. Examples of programming interfaces include web service interfaces, API (Application Programming Interface) interfaces, REST (Representational State Transfer) interfaces and so forth. In FIG. 1, connectivity exchange 104 includes one or more programming interfaces 111. The instant disclosure is not limited to the examples of programming interfaces described in this example and may include various other types of interfaces, which may be created in various programming languages.

Wireless Service Providers

WSPs provide wireless connectivity to users through various wireless transmission protocols such as Wi-Fi, WiMax™, 3G and so forth. WSP 112 provides wireless connectivity to Device A 144 via wireless access point 140. Wireless access point 140 broadcasts connectivity exchange identifier ("exchange identifier") 142 so that user computing devices such as Device A 144 are able to join exchange 104. Wireless access points such as wireless access point 140 typically broadcast one or more identifiers, including identifiers that may not be associated with the exchange. For example, a T-Mobile™ Hotspot wireless access point may broadcast two SSIDs, one associated with the T-Mobile™ Hotspot wireless services for T-Mobile™ users and a second one associated with the exchange.

Figure 2:
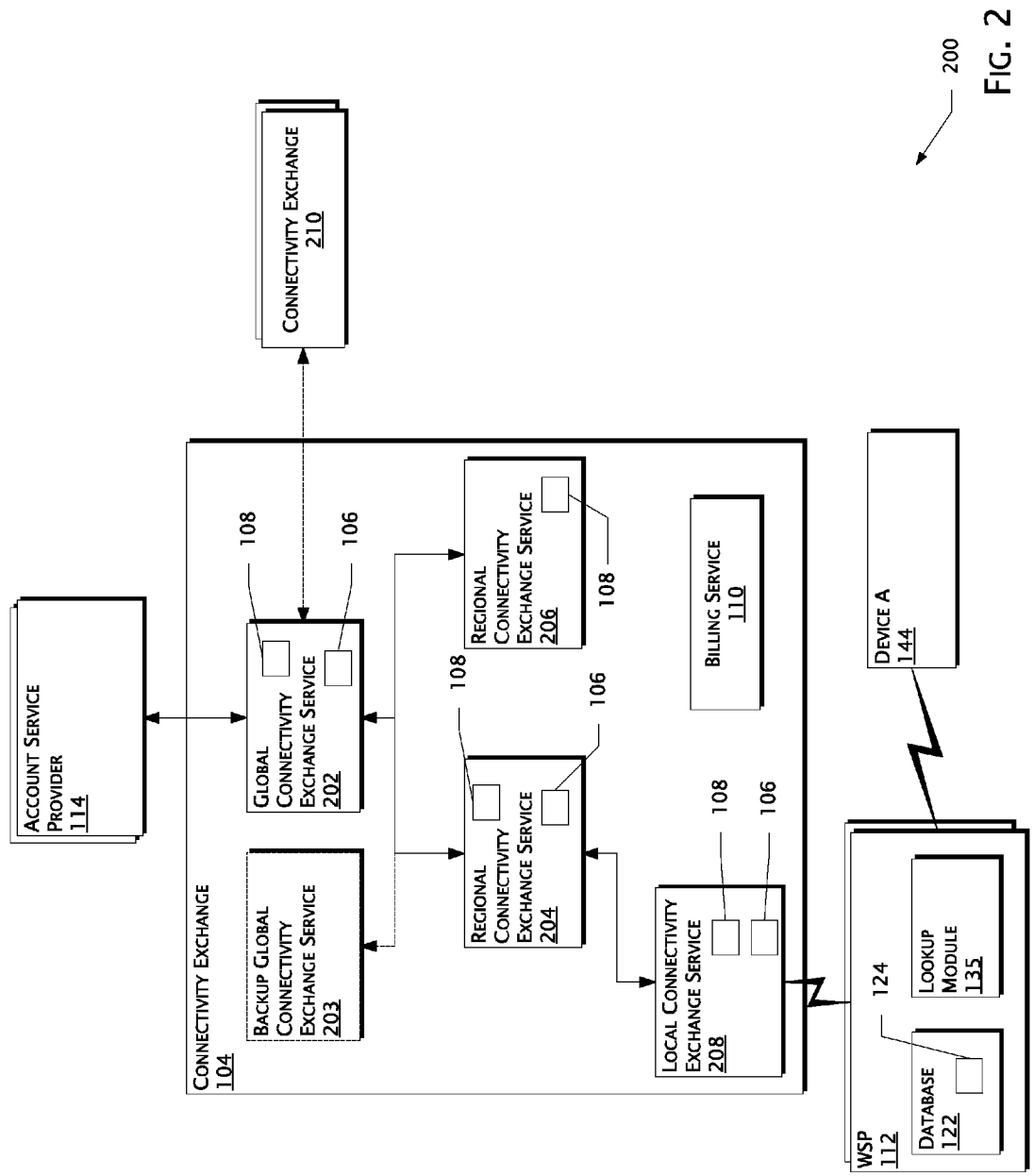
FIG. 2 illustrates an example implementation of an exchange for providing wireless connectivity to a large number of users and for the exchange to communicate with one or more other exchanges.

WSPs such as WSP 112 include one or more servers 130 and one or more databases 122. Server 130 includes certificate module 131 for managing and maintaining one or more certificates such as exchange certificate 108 and one or more unique authentication certificates 123 associated with members of exchange 104. As previously mentioned, exchange 104 provides server 130 exchange certificate 108 to validate it is a valid member of exchange 104. When a request is received from a WSP to authenticate a user, exchange 104 verifies the request is from a valid member of the exchange using exchange certificate 108. Once WSP 112 has been validated, exchange 104 processes the request for authentication and may forward the request to an ASP and/or a GSP, if appropriate. Exchange certificate 108 is administered by exchange 104. FIG. 2 illustrates how exchange 104 administers and distributes exchange certificate 108 as mentioned in FIG. 1.

Each service provider includes a unique authentication certificate for distributing to other service providers. Authentication certificates may be distributed to service providers via the exchange and/or directly between service providers. Server 130 includes one or more authentication certificates 123 of one or more other members of exchange 104. Note that server 130 also includes a unique authentication certificate 133 corresponding to WSP 112 for distributing to other service providers.

Authentication certificates such as authentication certificates 123 and 133 allow WSPs to authenticate users directly with ASPs and/or GSPs corresponding to the respective authentication certificates. For example, WSP 112 may use authentication certificate 123 to request authentication of a user by ASP 114 if exchange 104 is nonresponsive or unable to service a request. WSP 112 may directly request authentication of a user by the appropriate ASP and/or GSP if WSP 112 has a corresponding authentication certificate for that the ASP and/or GSP. WSP 112 may determine corresponding ASP/GSP using information provided by the user such as user credentials and so forth.

Both exchange certificates and authentication certificates are used to validate membership to an exchange and to validate service providers to other valid service providers of the exchange. As mentioned previously, validating service providers of an exchange is not limited to using certificates and may include but is not limited to smart cards, passwords, software modules executing on each exchange member, hardware devices such as crypto devices and variations of the like.

WSPs such as WSP 112 maintain a list of service providers. The list may include all service providers, service providers that the WSP has sent requests to, or variations of the like. WSP 112 maintains List D 124 in database 122. Databases such as database 122 include List D 124 for maintaining one or more member identifiers 126 and one or more member fields 128 corresponding to member information associated with members of exchange 104. Further, server 130 includes look-up module 135 for accessing List D 124. Note that lists may also include user information for authenticating users.

Figure 8:
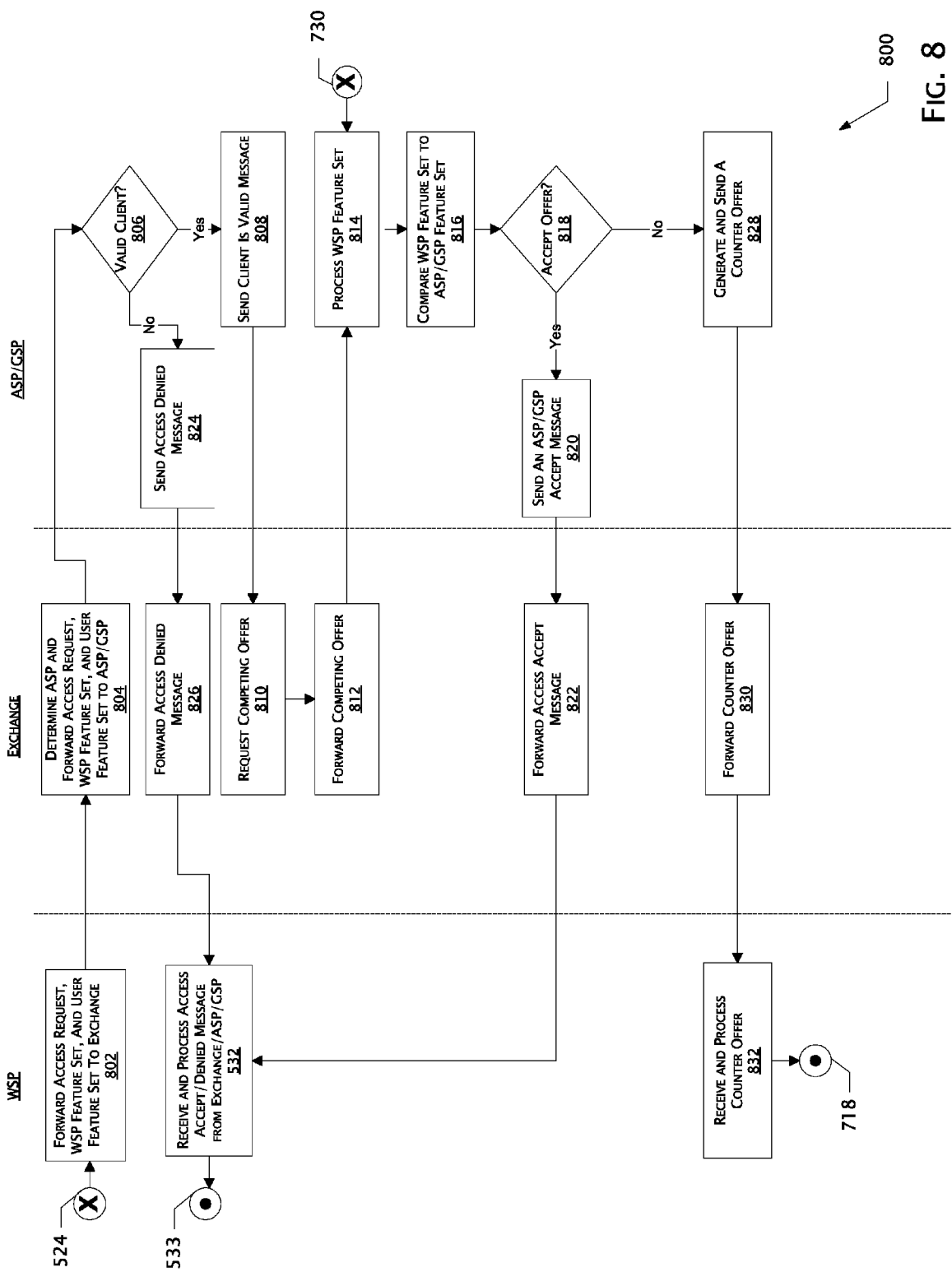
FIG. 8 illustrates a flow chart depicting an example implementation for an exchange to negotiate a rate between a WSP and a GSP to connect a user to the Internet.

As mentioned previously, examples of WSPs include but are not limited to cellular network providers, wireless hotspot providers, and the like. Further, individuals with wireless access points such as home owners with Wi-Fi connections connected to the Internet via DSL or cable modem may also join exchange 104. For example, an individual who has access to the Internet using a cable modem and has a wireless router can join the exchange and provide wireless connectivity to other users via the exchange. The individual may receive payment from a GSP or shared revenue with the exchange. FIG. 8 illustrates an example flowchart implementation as described in FIG. 1 that enables various scenarios including the previously mentioned scenario of an individual wireless service provider offering wireless connectivity via exchange 104.

Figure 5:
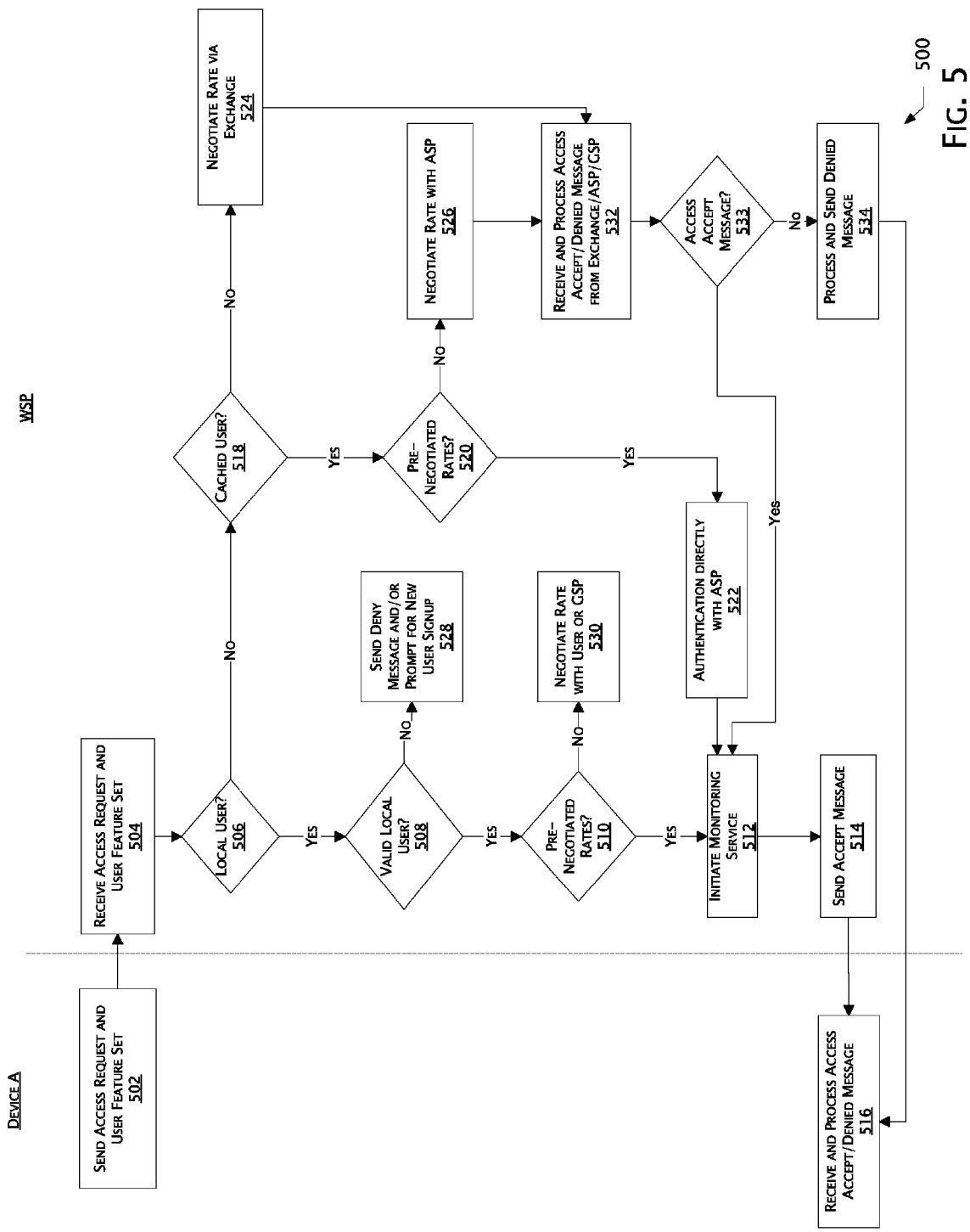
FIG. 5 illustrates a flow chart depicting an example implementation for a WSP to authenticate a user via an exchange.
Figure 9:
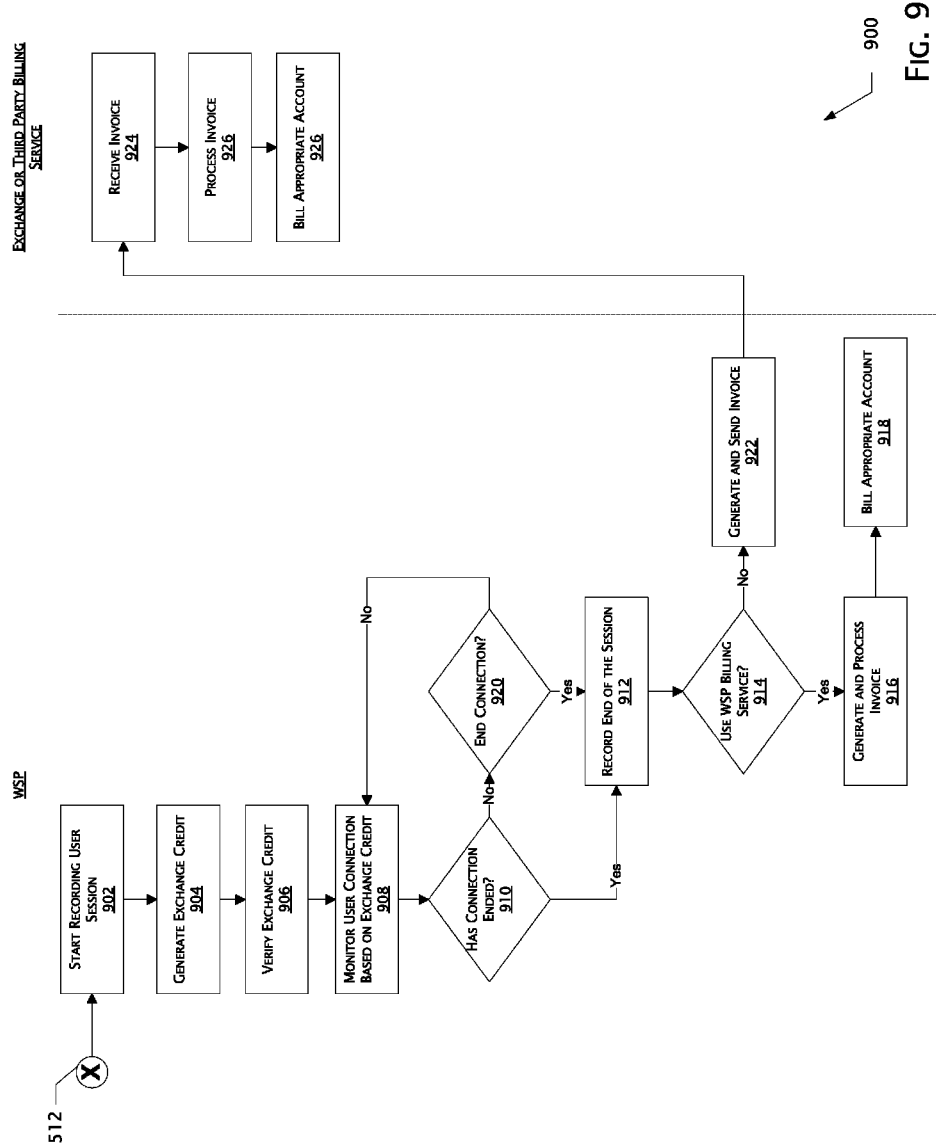
FIG. 9 illustrates a flow chart depicting an example implementation for a WSP executing a monitoring service and a billing service.

WSPs such as WSP 112 also include monitoring service 137, billing service 134 and invoice 139. Examples of monitoring services include hardware devices that monitor user connections such as edge devices, RADIUS servers, and the like. Further, monitoring services may be implemented in software. FIG. 5 and FIG. 9 illustrate how monitoring services and billing services may be implemented.

One or more of the aforementioned features of a WSP may be combined on one or more devices such as a wireless access point, a router, a radio, and the like.

Seamless Support of Multipe Wireless Transmission Protocols

User computing devices such as Device A 144 include one or more communication modules 146 for communicating with WSP 112 via wireless access point 140. Computing devices with multiple communication modules can communicate with different wireless access points that support different wireless transmission protocols and allow users various methods to access the Internet. Examples of communication modules include but are not limited to laptop wireless cards that support wireless transmission protocols such as Wi-Fi or 3G, USB drives that support Wi-Fi and or 3G and the like. Further exchange 104 allows computing devices such as Device A 144 with one or more communication modules 146 to transition seamlessly between WSPs offering different wireless transmission protocols. For example, when a user is initially on a Wi-Fi network and moves to a 3G network or the 3G network provides better performance, the user computing device may automatically negotiate a rate with the appropriate WSP for a new connection on the 3G network. The user can switch to the 3G network by selecting the new connection, when the Wi-Fi connection degrades or terminates, and so forth.

Note that separate communication modules are not required to support multiple wireless transmission protocols. For example, a single communication module may support various wireless transmission protocols. Further, support for two different wireless transmission protocols is not required. Users can transition between two different WSPs that offer the same wireless transmission protocol.

User computing devices may also include applications that use exchange programming interfaces such as programming interface 111 to access exchange 104. In FIG. 1, Device A 144 includes application 149 that uses programming interface 111 to interact with exchange 104.

Account Service Providers

As members of an exchange, ASPs enable their users to access the Internet via the exchange. Using a directory having one or more user accounts, ASPs allow WSPs to authenticate users using their directories via the exchange. ASP 114 includes directory 117 having one or more user accounts 116. Examples of directories include but are not limited to Microsoft® Active Directory®, Sun Microsystems Directory Server™, IBM Lotus Domino Directory™, and the like. FIG. 5 describes and illustrates how users are authenticated as described in FIG. 1.

However, as previously mentioned, in embodiments where a directory is not desired or not available, the ability to determine which users should be able to access the Internet via the exchange may be achieved using alternate means. For example, ASPs may also enable their users to have access to the Internet via the exchange using lookup tables, databases, email accounts such as Microsoft® Hotmail®, user accounts associated with social networking sites such as Facebook®, MySpace™, Linkedin®, and so forth.

Further, ASPs may prefer to grant users access to the Internet via the exchange in a group rather than on an individual basis. Examples for providing groups of users access include but are not limited to challenge/response words/phrases, pin numbers, passwords, hardware devices such as smart cards, and so forth.

As mentioned previously, ASPs are not limited to enabling their users access to the Internet via the exchange using directories. ASPs may also outsource management and maintenance of their users to a GSP. For example, a GSP may provide businesses with user accounts for the exchange to authenticate users. IT administrators of a business may administer how these business users are able to access the exchange via the service provider and remove the need to expose their user directories. This also serves as an alternative for businesses that either do not have user directories or would rather outsource the logistics of managing such services.

Business policy such as policies concerning what data is accessible from the Internet, read/write privileges and the like can be administered via exchanges. ASP 114 includes policy 119 for determining the requirements for users while accessing the Internet via the exchange. Policy may be included in feature sets.

General Service Providers

GSPs such as GSP 105 provide general service to members of the exchange and users of the exchange. Note that ASPs are a type of GSP that provide account services and WSPs are a type of GSP that provide wireless connectivity. GSPs may also provide services such as policy enforcement, advertising, technical support, and so forth. GSPs are not limited to these described examples and may include various other services.

Joining the Connectivity Exchange

Figure 4A:
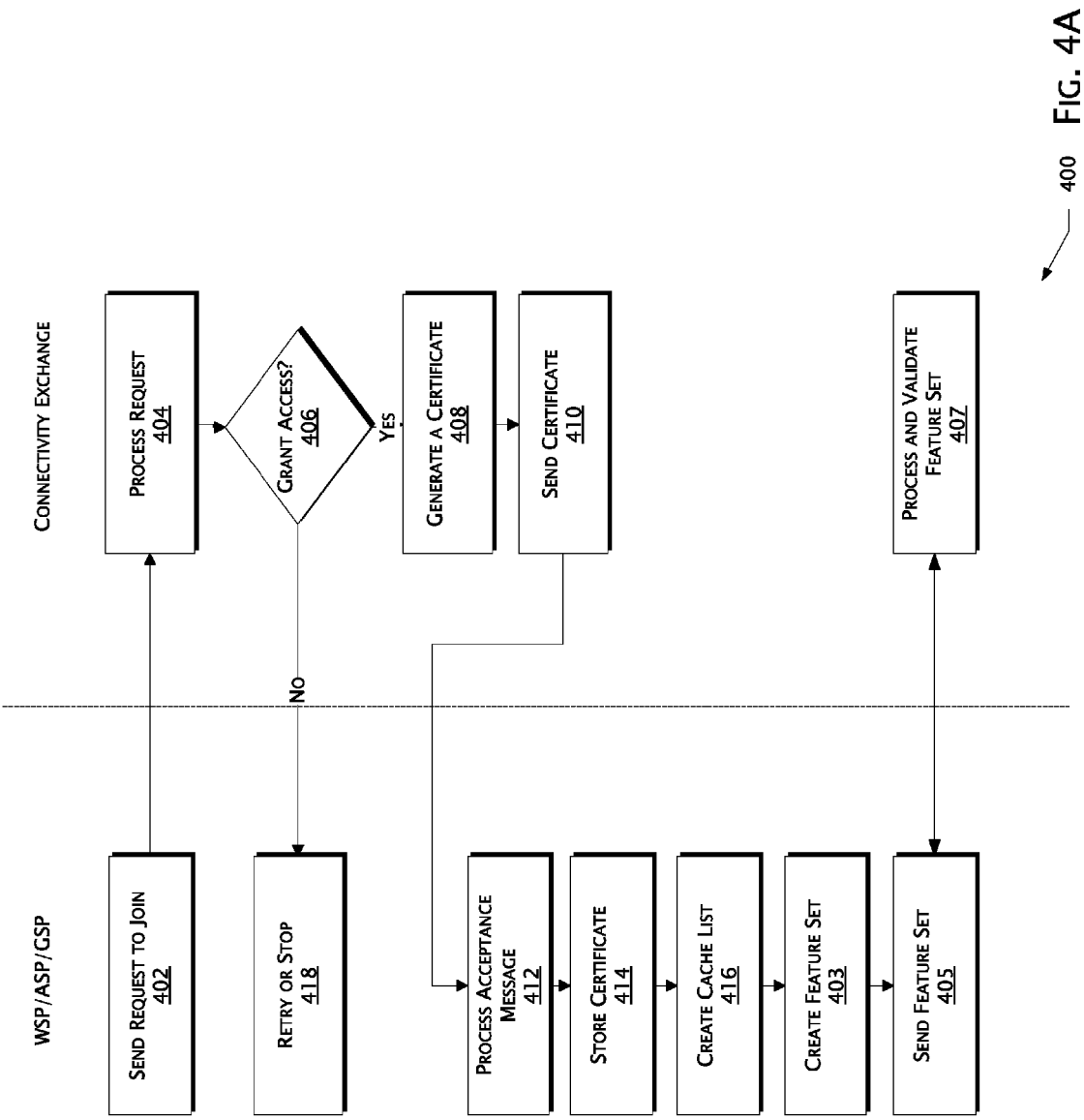
FIG. 4A illustrates a flow chart depicting an example implementation for a service provider to join an exchange using a certificate.
Figure 4B:
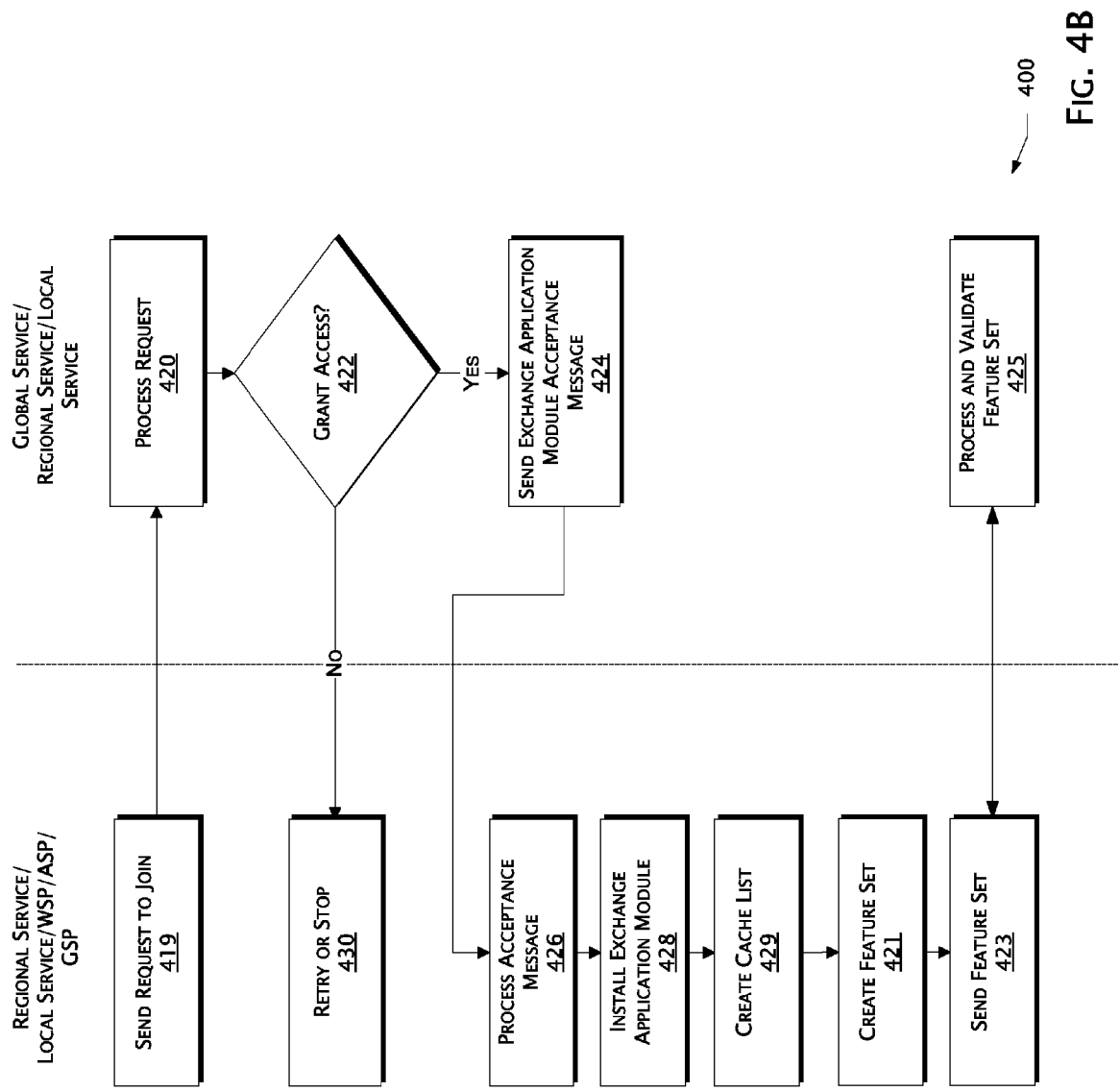
FIG. 4B illustrates a flow chart depicting an example implementation for a service provider to join an exchange using a software application module.

Exchanges such as exchange 104 provide various methods for enabling WSPs, ASPs, and GSPs to join. For example, exchanges may allow WSPs and ASPs to join using a protocol that automates the process allowing the exchange to request information from the WSP, ASP and/or GSP and facilitate the joining process. Exchanges may also provide a URL for administrators of WSPs and ASPs to access information to join the exchange. Exchanges also provide ways for WSPs and ASPs to identify and verify they are valid members. Exchange 104 includes exchange certificate 108 and distributes exchange certificate 108 to validate service providers. As mentioned previously, certificates are one way to enable identification and validation but exchanges are not limited to using certificates. FIGS. 4A and 4B discuss and illustrate how service providers join exchange 104 as mentioned in FIG. 1.

Authenticate Users Via the Exchange

Exchange 104 may use various methods to authenticate users. These various methods may include relaying messages between WSPs and ASPs or enabling a direct connection between WSPs and ASPs so that a WSP can authenticate a user directly with an ASP. Further, these various methods may include logic for negotiating firewalls, NAT boxes and so forth. Exchange 104 supports the above mentioned relaying of messages and enabling direct communication between WSPs and ASPs. Users typically have various options to choose from in wirelessly connecting to the Internet. Wide area networks such as wide area network 120 may include one or more WSPs 112. Note that not all of the WSPs in a wide area network may be members of an exchange or may be members of one or more exchanges.

Using user credential 148 provided by a user of Device A 144 or from a data store (not shown) that maintains user credentials, WSP 112 attempts to authenticate the user via exchange 104. Applications running on user devices may also include credentials that are used to authenticate a user or application via the exchange. Application 149, running on Device A 144 includes user credentials (not shown) for use in authenticating application 149 or the user.

As previously mentioned, WSPs may provide local authentication services such as Captive Portal, 802.1x, RADIUS, and the like. For example, a WSP may be using 802.1x and RADIUS for local authentication. When a user requests access to the Internet via the exchange using the WSP, the WSP may attempt to authenticate the user locally. If the user has previously used the WSP, local authentication may be possible and may be sufficient to authenticate the user with the appropriate ASP and negotiate a rate. If not, the WSP sends the request to the exchange and the exchange forwards the request to the appropriate ASP. The ASP may include Microsoft® Active Directory® Federated Services (ADFS) for providing user authentication via the exchange. Note that preferences and/or security settings of each WSP and/or ASP may determine how users are authenticated. FIGS. 5, 6, 7, and 8 discuss and illustrate how exchange 104 authenticates users as mentioned in FIG. 1.

Negotiating Rates Based On Feature Sets

Rates are negotiated for wireless connectivity via the exchange using feature sets. Each WSP has one or more feature sets that describe services available and/or offered by the WSP corresponding to the wireless connectivity and/or agreements for use of the wireless connectivity.

Users may have their own feature sets that specify their preferences for wireless connectivity including but not limited to QoS, bandwidth, security and so forth. These user feature sets may also include user preferences for agreeing to use wireless connectivity including but not limited to agreements to advertising, forms of payment and so forth.

Applications running on user computing devices may also include their own feature sets. Application 149 includes one or more feature sets (not shown).

Referring to FIG. 3, feature sets include attributes corresponding to one or more categories such as a contract category, a service category, and a device category. Feature set B 136 includes the following one or more attributes 302 associated with contract category 310: counter offer 316, offer is good until 318, advertising 320, billing type 322, memberships 324, and payment type 326. Feature set B 136 also includes the following attributes associated with service category 312: encryption 328, bandwidth 330, VPN (Virtual Private Network) support 332, QoS 334, authentication 336, time of day limitations 338, and location 340. Further, feature set B 136 includes the following attributes associated with device category 314: device type 342, screen size 344, and communication module types 346.

Each attribute may include parameters that specify a desired value, a minimum value and/or a priority value corresponding to an attribute for use in negotiating rates. Feature set B 136 includes desired value 304, minimum value 306, and priority value 308. For example, a user may have a desired value for bandwidth, a minimum value of bandwidth, and a priority value of bandwidth that places the bandwidth attribute higher than the security attribute (that may also have desired values, minimum values, and priority values).

Feature sets may be stored as text files, data stored in a database, data stored in a bit array, or in a registry. For example, feature sets stored as data in a bit array may have one or more bits associated with a value for a particular attribute. In FIG. 1, feature set B 136 is stored in database 122. Note that feature sets may be stored in various formats and in various locations and are not limited to the examples described herein.

Transmitting features sets between devices may be accomplished using protocols, web services, the exchange of text files, and so forth.

As previously mentioned, rates can be pre-negotiated and/or dynamically negotiated. FIGS. 5, 6, 7 and 8 discuss and illustrate how rates are negotiated dynamically as described in FIG. 1. Note that the implementation in FIG. 3 has been deliberately expanded to illustrate various aspects that are possible with the instant disclosure. Not all of the elements illustrated in FIG. 3 are required in every embodiment and they are not intended to limit the scope of types of services corresponding to attribute categories and the like.

Marketplace for 3rd Party Participants Via the Exchange

Returning to FIG. 1, developers and/or distributors of software applications and services may pay for users to access the Internet via the exchange. Their software and/or services may include one or more feature sets for accessing the Internet via the exchange that takes into consideration performance considerations, user scenarios, subscriptions and the like. Further, developers and/or distributors may pay for users connection to the Internet via the exchange when they are using their product.

Exchanges such as exchange 104 enable advertisers and/or third party vendors to pay for users to access the Internet via the exchange in return for determining the users advertising experience. Examples of advertising experience include advertising on search results, pop ups via instant messengers, message boxes triggered in the OS, banners in the browsers and so forth. Further, WSPs may monetize their wireless connectivity by receiving a percentage of the advertising revenue made by advertisers using the exchange.

Accounting/Billing Services

As mentioned previously, billing services may be performed by the exchange, the WSP, an intermediary service, and/or the user, and various combinations of the like. In FIG. 1, billing service 110 manages accounting and billing for users accessing the Internet using exchange user accounts. Billing service 134 executes on server 130 at the WSP 112 and manages accounting and billing for users accessing the Internet using accounts that are associated with exchange 104 but are not managed by exchange 104. Note that billing service 110 could also manage the accounting and billing for these users if desired.

Billing is seamless for users, WSPs and ASPs. Users may pay using credit cards, PayPal™, direct deposit and so forth. FIG. 9 illustrates and describes the invoice and billing services as described in FIG. 1.

General Environment of a Connectivity Exchange Using Global, Regional, and Local Services FIG. 2 illustrates an example environment 200 of an exchange implemented in a centralized architecture that provides wireless connectivity to many users. The example environment 200 is only one example of an implementation of an exchange and is not intended to limit the examples described in this application to this particular implementation. Not all of the elements in FIG. 2 are required in every embodiment and the various elements may be put together in different ways to implement different systems.

In the following description of FIG. 2, continuing reference is made to elements and reference numerals shown and described in FIG. 1.

Exchanges may include one or more global connectivity exchange services ("global services") for managing connections to the exchange. Additional global services may be added to the exchange to improve load balancing, provide redundancy in the event of failure and the like. Global services are operatively connected to one or more regional connectivity exchange services ("regional service") and global services manage the list of service providers. In FIG. 2, exchange 104 includes global service 202. Global service 202 includes List A 106 and is operatively connected to regional services 204 and 206 and ASP 114. List A 106 maintains information about service providers.

Exchange 104 also includes backup global service 203. Backup global service 203 may function in the place of global service 202 in the event global service 202 fails so that service is not interrupted.

Global services may also be operatively connected to other exchanges that may be owned and managed by other companies and/or located in different locations. In FIG. 2, global service 202 is operatively connected to exchange 210. Note that exchange 210 may be located in a different country.

Regional services are operatively connected to one or more local connectivity exchange services ("local services"). Local services are able to connect to global services via the regional services. Local services are also operatively connected to WSPs. In FIG. 2, local service 208 is operatively connected to regional service 204 and WSP 112. Regional service 204 includes List A 106 and local service 208 also includes List A 106. Device A 144 accesses the exchange 104 via WSP 112. Note that this is only one example implementation of an exchange and variations of the like may allow the exchange to scale and/or operate effectively to suit various technical and/or business needs. In the implementation described in FIG. 2, service providers may connect to a local service, a regional service, or a global service. Further, regional and local services may include lists that are a subset of the global list (List A 106) for efficiency and scaling purposes.

Service Providers Joining the Connectivity Exchange

Referring to FIG. 4A, service providers may join the exchange by sending a request to join the exchange. FIG. 4A is a flow chart 400 depicting an example in the context of FIG. 2 of a WSP connecting to exchange 104. The flow chart 400 depicts only one example of an implementation for connecting a WSP to an exchange and is not intended to limit the examples described in this application to this particular implementation.

In the following description of FIG. 4A, continuing reference is made to elements and reference numerals shown and described in both FIG. 1 and FIG. 2.

When connecting a WSP to an exchange, the WSP typically sends a request to the exchange to join. At block 402, WSP 112 sends a request to join exchange 104.

The exchange receives the request, processes the request and determines if the requesting WSP should have access. At block 404, exchange 104 receives a request from WSP 112 and processes the request. If the exchange determines the WSP should not have access, a denial message is sent to the WSP. At block 406, exchange 104 does not grant access and sends a denial message to WSP 112.

When the WSP receives a denial message, it may either retry or stop. At block 418, WSP 112 may retry joining or stop trying to join.

If the exchange determines the WSP should have access, a certificate is generated and is sent to the WSP. At block 406, exchange 104 grants access. At block 408, a certificate is generated and at block 410, exchange 104 sends the accept message and certificate to WSP 112.

When the WSP receives an acceptance message, it processes the acceptance message, stores the certificate and creates a cache list. At block 412, WSP 112 processes the acceptance message. At block 414, WSP 112 stores the certificate. At block 416, WSP 112 creates List D 124.

WSPs such as WSP 112 create feature sets to be used in negotiating rates with GSPs. At block 403, WSP 112 creates feature set B 136. At block 405, WSP 112 validates feature set B 136 with exchange 104. At block 407, exchange 104 processes and validates feature set B 136.

In an alternate implementation, a software application module may be sent from the exchange to the WSP. The software application module allows the WSP to join the exchange and allows users to access the Internet via the exchange. Referring to FIG. 4B, WSPs may join exchanges by sending a request to join the exchange. FIG. 4B is a flow chart 400 depicting an example in the context of FIG. 2 of connecting WSP 112 to exchange 104. The flow chart 400 depicts only one example of an implementation for connecting a WSP to an exchange and is not intended to limit the examples described in this application to this particular implementation.

In the following description of FIG. 4B, continuing reference is made to elements and reference numerals shown and described in both FIG. 1 and FIG. 2.

When connecting a WSP to an exchange, the WSP typically sends a request to the exchange to join. At block 419, WSP 112 sends a request to join exchange 104.

The exchange receives the request, processes the request and determines if the requesting WSP should have access. At block 420, exchange 104 receives a request from WSP 112 and processes the request. If the exchange determines the WSP should not have access, a denial message is sent to the WSP. At block 422, exchange 104 does not grant access and sends a denial message to WSP 112.

When the WSP receives a denial message, it may either retry or stop. At block 430, WSP 112 may retry joining or stop trying to join.

If the exchange determines the WSP should have access, a certificate is generated and is sent to the WSP. At block 422, exchange 104 grants access. At block 424, exchange 104 sends an exchange application module to WSP 112.

When the WSP receives an acceptance message, it processes the acceptance message, stores the exchange application module and creates a cache list. At block 426, WSP 112 processes the acceptance message. At block 428, WSP 112 installs the exchange application module. At block 429, WSP 112 creates List D 124.

Note that joining a WSP to an exchange may include variations of the steps described in the previous flowcharts and may be modified and/or removed to accommodate different architectures.

Maintaining Lists of Previous and Current Connections

Returning now to FIG. 2, WSPs may include lists for maintaining each of their own connections to various services and/or devices. These lists allow exchanges to scale their architecture to service many users and/or requests. By maintaining lists at different locations, unnecessary requests do not congest the network.

Consider the scenario where a user previously connected to a WSP and wants to connect to the same WSP again at a later time. When the device connected to the WSP the previous time, the user provided a set of user credentials. The WSP performs a lookup on the WSP list to determine if the user had accessed the Internet via the exchange using this WSP. Since the user had not, the WSP forwards the request to the exchange. The exchange performs the same look up on the exchange list to find the appropriate location to authenticate the user and provides the information to the WSP. FIG. 5 illustrates how Device A 144 is authenticated by exchange 104 and how lists A and D 106, 124 respectively, are used as described in FIG. 1.

Authenticating a User Via the Exchange

FIG. 5 is a flow chart 500 depicting an example in the context of FIG. 1 of a WSP authenticating a user via an exchange. The flow chart 500 depicts only one example of an implementation for authenticating users and is not intended to limit the examples described in this application to this particular implementation.

In the following description of FIG. 5, continuing reference is made to elements and reference numerals shown and described in FIG. 1.

Users provide user credentials via their devices to access the Internet via the exchange. Along with user credentials, devices send feature sets to the WSP. At block 502, Device A 144 sends a request to access the Internet and feature set A 150 to WSP 112.

A WSP receives a request to access the Internet and the feature set. At block 504, WSP 112 receives the request and feature set A 150 and processes the request.

The WSP determines if the user is a local user. At block 506, WSP 112 determines the user is a local user. For example, WSP 112 may verify that user credentials 148 include a domain that corresponds to the domain for WSP 112.

If the user credentials include the domain of the WSP indicating the user is local, the WSP determines if the user is a valid local user. At block 508, WSP 112 determines user credentials 148 are valid. For example, WSP 112 may verify the username and password in user credentials 148 correspond to the username in a local directory (not shown) that stores user information for users associated with the local domain.

If the user is a valid local user, the WSP determines if the user has pre-negotiated rates for accessing the Internet. If the user has pre-negotiated rates, the WSP initiates accounting and billing and sends the user an accept message. At block 510, WSP 112 determines the user has pre-negotiated rates. At block 512, WSP 112 initiates monitoring service 137. At block 514, WSP 112 sends an accept message to Device A 144. Note that the user's feature set may still be referenced and/or processed although the user has pre-negotiated rates.

The device receives the accept message and processes the message. At block 516, Device 144 receives the accept message from WSP 112 and processes the message. Device 144 my access the Internet after receiving the accept message.

Figure 6:
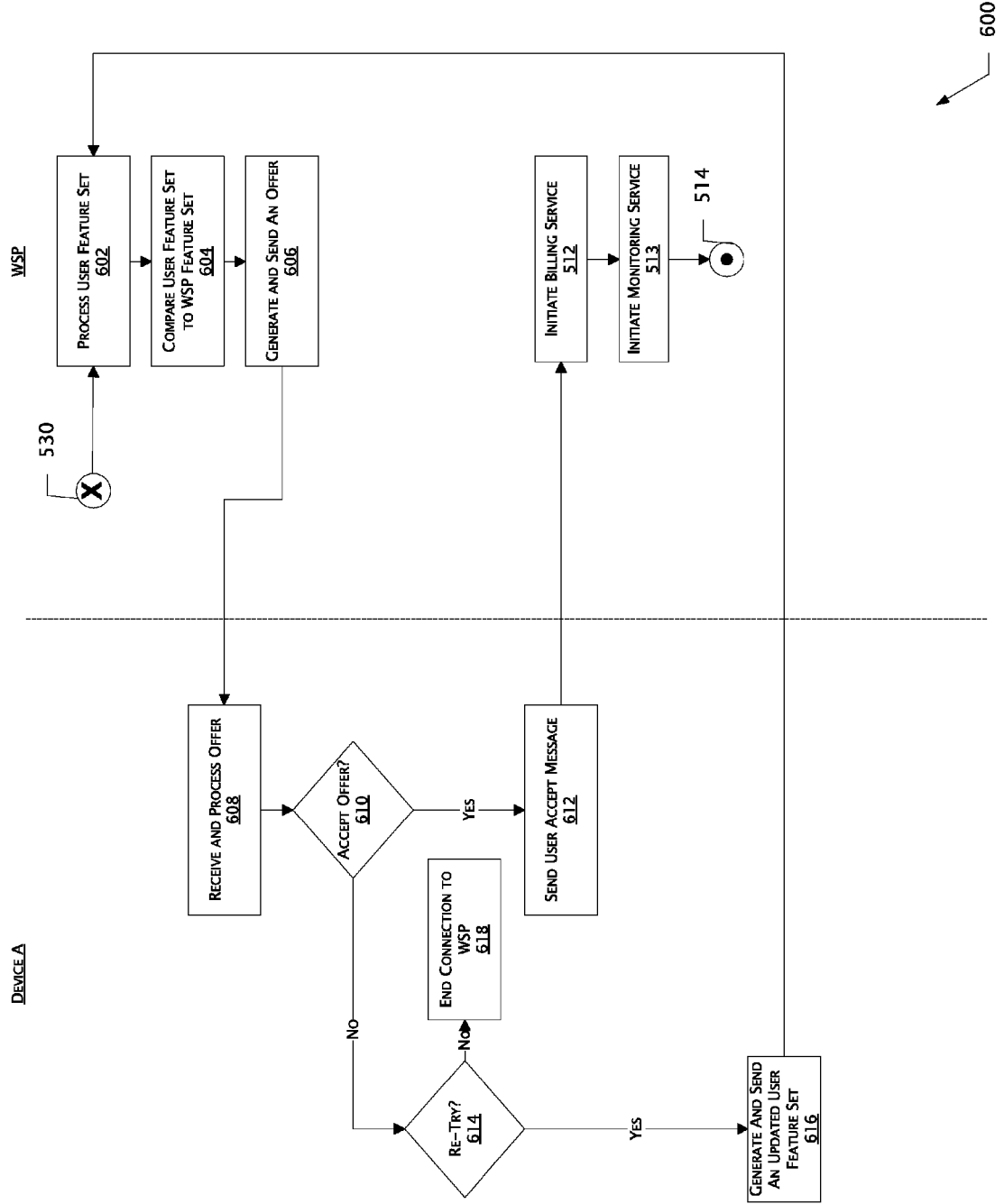
FIG. 6 illustrates a flow chart depicting an example implementation for a WSP and a user to negotiate a rate for connecting to the Internet.

If a valid local user does not have pre-negotiated rates, the WSP negotiates a rate with the user. Returning to block 510, WSP 112 determines the user does not have pre-negotiated rates. At block 530, WSP 112 negotiates a rate with the user and/or a GSP. FIG. 6 illustrates an example flowchart of a WSP dynamically negotiating a rate with a user in more detail.

If the user is a local user but is not a valid user, the WSP sends a deny message and may prompt the user to sign up for an account. Returning to block 508, WSP 112 determines the user is not a valid user. At block 528, WSP 112 sends a deny message to Device A 144 and prompts the user to sign up for an account.

If the user is not a local user, the WSP determines if the user is associated with a known member of the exchange via an ASP. Returning to block 506, WSP 112 determines the user is not a local user.

If the user is a known member of the exchange via an ASP (if the user information is in a list maintained by the WSP), the WSP determines if the user has a pre-negotiated rate. At block 518, WSP 112 determines the user is a known member of the exchange.

If the user has a pre-negotiated rate, the WSP authenticates the user via the ASP and initiates monitoring. At block 520, WSP 112 determines the user has a pre-negotiated rate. At block 522, WSP 112 authenticates the user via ASP 114. At block 512, WSP 112 initiates monitoring.

Figure 7:
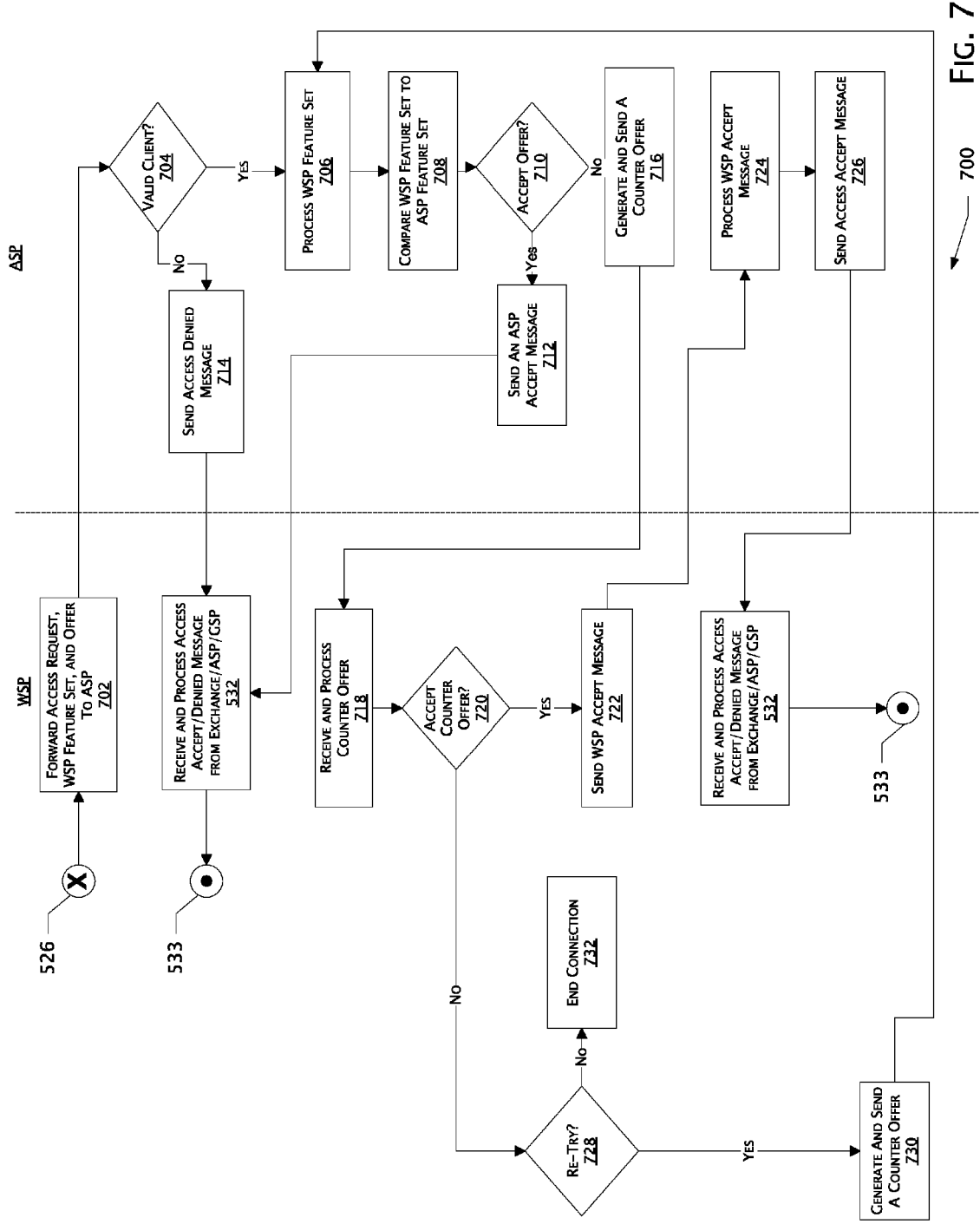
FIG. 7 illustrates a flow chart depicting an example implementation for a WSP and an ASP to negotiate a rate for a user to connect to the Internet.

If the user does not have a pre-negotiated rate, the WSP attempts to negotiate a rate with the user's corresponding ASP. Returning to block 520, WSP 112 determines the user does not have a pre-negotiated rate. At block 526, WSP 112 negotiates a rate with ASP 114. FIG. 7 illustrates an example flowchart that describes a WSP dynamically negotiating a rate with an ASP.

If the user is not a cached user (the user information is not in a list maintained by the WSP), the WSP attempts to negotiate a rate with the user's ASP via the exchange. Returning to block 518, WSP 112 determines the user is not a cached user. At block 524, WSP 112 attempts to negotiate a rate with ASP 114 via exchange 104. FIG. 8 illustrates an example implementation of a WSP dynamically negotiating a rate with an ASP via the exchange.

After attempting to negotiate a rate either directly with the ASP or GSP or via the exchange, the WSP receives either an access accept or deny message. The WSP processes the message and sends an appropriate message to the device. At block 532, WSP 112 receives an access accept message or an access denied message from ASP 114 or exchange 104.

The WSP processes the message. If the message is an access accept message, the WSP initiates the monitoring service. If the message is an access denied message, the WSP processes the denied message and sends the denied message to the user. At block 533, WSP 112 determines the message is an access accepted message. At block 512, WSP 112 initiates monitoring service 137.

Returning to block 533, if WSP 112 receives an access denied message, WSP 112 processes the access denied message and sends the access denied message to Device A 144. At block 516, Device A 144 receives and processes the access denied message.

WSP Negotiates with Users

Referring to FIG. 6, a WSP negotiates a rate directly with a user for accessing the Internet. The implementation in FIG. 6 has been deliberately expanded to illustrate various aspects that are possible with the instant disclosure. Not all of the elements illustrated in FIG. 6 are required in every embodiment and they are not intended to limit the scope of how WSPs negotiate rates with users. Further, in the following description of FIG. 6, continuing reference is made to elements and reference numerals shown and described in FIG. 1 and FIG. 5.

As previously described in FIG. 5, a WSP determines if a user is local and if the user has pre-negotiated rates. If the user does not have pre-negotiated rates, the WSP attempts to negotiate a rate with a user. At block 530, the WSP attempts to negotiate a rate with the user.

The WSP receives and processes the user's feature set. At block 602, WSP 112 receives and processes feature set A 150. To generate and send an offer to the user, the WSP compares the user's feature set to the WSP's feature set. At block 604, WSP 112 compares feature set A 150 to WSP feature set 141. At block 606, WSP 112 generates and sends an offer to the user.

The user receives and processes the offer. At block 608, Device A 144 receives and processes the offer. If the user chooses to accept the offer, the user's device sends an accept message to the WSP. At block 610, the user accepts the offer. At block 612, Device A 144 sends an accept message to WSP 112. The WSP initiates a billing service and a monitoring service.

If the user chooses not to accept the offer, the user may re-try negotiating with the WSP. At block 610, the user chooses not to accept the offer. If the user chooses to re-try negotiating with the WSP, the user may send an updated feature set. At block 614, the user chooses to re-try negotiating with WSP 112. At block 616, the user generates and sends an updated feature set A 150. The WSP receives and processes the updated feature set.

If the user chooses not to re-try negotiating with the WSP, the connection between the user's device and the WSP is disconnected. At block 614, the user chooses not to re-try negotiating with WSP 112. At block 618, the connection between Device A 144 and WSP 112 is disconnected.

WSP Negotiates Directly with ASP

FIG. 7 is a flow chart 700 depicting an example in the context of FIG. 1 of a WSP negotiating with an ASP for a user to connect to the Internet. The flow chart 700 depicts only one example of an implementation for a WSP negotiating with an ASP for a user to connect to the Internet and is not intended to limit the examples described in this application to this particular implementation. The implementation in FIG. 7 has been deliberately expanded to illustrate various aspects that are possible with the instant disclosure. Not all of the elements illustrated in FIG. 7 are required in every embodiment and they are not intended to limit the scope of how WSPs negotiate rates with users. Further, in the following description of FIG. 7, continuing reference is made to elements and reference numerals shown and described in FIG. 1 and FIG. 5.

In FIG. 7, the WSP forwards an access request for the user to access the Internet, the WSP's feature set and an offer to an ASP. At block 702, WSP 112 forwards the access request, feature set B 136 and an offer.

The ASP receives the access request and determines if the user is a valid client. If the user is a valid client, the ASP processes the WSP's feature set. At block 704, ASP 114 determines the user is a valid client. At block 706, ASP 114 processes feature set B 136.

The ASP processes the WSP's feature set and compares the WSP's feature set to the ASP's feature set. The ASP determines if the WSP's feature set and offer are acceptable. If the ASP accepts the offer, the ASP sends an ASP accept message to the WSP. At block 708, ASP 114 compares feature set B 136 to feature set C 115. At block 710, ASP 114 accepts the offer. And at block 712, ASP 114 sends an accept message to WSP 112.

Returning to block 710, if the ASP does not accept the offer the ASP generates and sends a counter offer to the WSP. At block 716, ASP 114 generates and sends a counter offer to WSP 112.

The WSP receives and processes the counter offer and determines whether or not to accept the counter offer. If the WSP accepts the offer, the WSP sends an accept message to the ASP. The WSP receives and processes the accept message and sends an accept message to the WSP. At block 718, WSP 112 receives and processes the counter offer. At block 720, WSP 112 accepts the offer. At block 722, WSP 112 sends an accept message.

Returning to block 720, if the WSP does not accept the offer the WSP may re-try negotiating with the ASP. If the WSP re-tries negotiating with the ASP, the WSP generates and sends a counter offer. At block 728, WSP 112 re-tries negotiating with ASP 114. At block 730, WSP 112 generates and sends a counter offer. At block 706, ASP 114 receives and processes the counter offer.

Returning to block 728, if the WSP chooses not to re-try, the connection between the WSP and the user's device is disconnected. At block 732, WSP 112 disconnects the connection with Device A 144.

Returning to block 704, if the client is not a valid client the WSP sends an access denied message. At block 714, ASP 114 sends an access denied message to WSP 112.

WSP Negotiates with ASP Via Exchange

FIG. 8 is a flowchart 800 depicting an example illustration of how a WSP negotiates with an ASP via the exchange to determine a rate for a user to access the Internet. The implementation in FIG. 8 has been deliberately expanded to illustrate various aspects that are possible with the instant disclosure. Not all of the elements illustrated in FIG. 8 are required in every embodiment and they are not intended to limit the scope of how WSPs negotiate rates with users. Further, in the following description of FIG. 8, continuing reference is made to elements and reference numerals shown and described in FIG. 1 and FIG. 5.

As previously mentioned in FIG. 5, the WSP determines if the user is a cached user. If the user is not a cached user, the WSP attempts to negotiate a rate for the user to access the Internet with the user's ASP via the exchange. The exchange determines the user's ASP and forwards the access request, the WSP feature set, and the WSP's offer to the appropriate ASP. Referring to FIG. 5, at block 524, the WSP starts the negotiation process with the ASP via the exchange. Returning to FIG. 8, at block 802 WSP 112 forwards the access request, feature set B 136, and an offer to the exchange. At block 804, exchange 104 determines the appropriate ASP for the user and forwards the access request, feature set B 136 and offer.

As similarly described in FIG. 7, the ASP determines if the user is a valid client. If the user is a valid client, the ASP sends the exchange a message indicating the user is valid. At block 806, ASP 114 determines the user is a valid client. At block 808, ASP 114 sends exchange 104 a message indicating the user is valid.

After notification that the user is a valid client, the exchange requests competing offers from one or more other WSPs. If any competing offers are received by the exchange, the exchange forwards the competing offers to the ASP. At block 810, exchange 104 requests a competing offer from one or more WSPs. At block 812, exchange 104 forwards any received competing offers to ASP 1114.

The ASP receives any feature sets corresponding to the competing offers and processes the feature sets, including the originally received feature set. At block 814, ASP 114 receives and processes feature set B 136 and any corresponding competing feature sets. At block 816, ASP 114 compares the received feature sets against feature set C 115 corresponding to ASP 114.

If the ASP accepts the offer, the ASP sends an accept message. The accept message is forwarded to the WSP. At block 818, ASP 114 accepts the offer from WSP 112. At block 820, ASP 114 sends an access accept message to exchange 104. At block 822, exchange 104 forwards the access accept message to WSP 112.

Returning to block 818, if the ASP does not accept the offer, the ASP generates and sends a counter offer. The exchange receives and forwards the counter offer to the WSP. The WSP receives and processes the counter offer as similarly described in FIG. 7. At block 828, ASP 114 generates and sends a counter offer. At block 830, exchange 104 receives and forwards the counter offer to WSP 112. At block 832, WSP 112 receives and processes the counter offer.

Returning to block 806, if the user is not a valid client, the ASP sends an access denied message. The exchange receives the access denied message and forwards the access denied message to the WSP. At block 824, ASP 114 sends an access denied message. At block 826, exchange 104 receives the access denied message and forwards the access denied message to WSP 112. Note that exchange 104 may forward the exact message received from WSP 112 or send a message generated by exchange 104 corresponding to the access denied messaged received from ASP 114.

Monitoring and Billing

FIG. 9 is a flowchart 900 depicting an example illustration of a monitoring service and a billing service. The implementation in FIG. 9 has been deliberately expanded to illustrate various aspects that are possible with the instant disclosure. Not all of the elements illustrated in FIG. 9 are required in every embodiment and the various elements may be put together in different ways to implement different systems. Further, in the following description of FIG. 9, continuing reference is made to elements and reference numerals shown and described in FIG. 1 and FIG. 5.

As previously described in FIG. 5, the WSP initiates a monitoring service. At block 512, the monitoring service is initiated.

When the WSP initiates the monitoring service, the WSP begins recording the user's session. At block 902, WSP 112 starts recording the user's session.

The WSP generates an exchange credit based on the agreed offer and verifies the generated exchange credit is acceptable to the user and/or the GSP/ASP. At block 904, WSP 112 generates exchange credit 138. At block 906, WSP 112 verifies the exchange credit with ASP 114. Note that WSP 112 may validate the exchange credit with exchange 104 or the user of Device A 144 in addition to or in lieu of ASP 114.

WSPs monitor user connections based on the agreed connectivity exchange credit. When the user ends the connection, the WSP stop recording the user session and determines which billing service to use. If the WSP billing service is used, the WSP billing service generates an invoice based on the recorded session and the agreed exchange connectivity credit. At block 908, WSP 112 monitors the user's connection based on exchange connectivity credit 138. At block 910, WSP 112 determines if the user ended the connection. For example, the user may have powered off the computing device. At block 920, WSP 112 determines if the user connection should be terminated. For example, if the user has reached a maximum time limit on the agreed usage, the WSP may end the connection.

If the user's connection is ended, the WSP stops recording the user's session. At block 912, WSP 112 stops recording the user's session.

WSPs such as WSP 112 determine which billing service should be used such as the WSP billing service, the exchange billing service, or the like. At block 914, WSP 112 determines billing service 134 (WSP billing service) will be used. At block 916, billing service 134 generates and processes invoice 139 based on the user's usage and exchange connectivity credit 138. At block 918, WSP 112 bills the appropriate account for the user's usage. This may be determined from the connectivity exchange credit 138.

In another example, the user and/or ASP may prefer the exchange performing the billing. Returning to block 914, if the WSP 112 uses billing service 110 (maintained by exchange 104) or the user prefers using billing service 110, WSP 112 sends invoice 139 to billing service 110. At block 922, WSP 112 generates and sends invoice 139 to exchange 104. At block 924, billing service 110 receives invoice 139. At block 926, billing service 110 processes invoice 139 and at block 926, billing service 110 bills the appropriate account for the user's usage. This may be determined from the connectivity exchange credit 138.

Third party billing services may also be used. Third party billing services include but are not limited to a GSP, an ASP, financial institutions such as credit card companies and banks, cable companies, telephone companies, and so forth. For example, the invoice for the user's usage may be received by the user's cell phone provider and integrated into the user's cell phone bill so the user may be billed appropriately, without a separate bill. This also allows third party billing services to integrate the user's usage with other services such as allowing users to earn connectivity exchange credits, convert other paid-for-services for connectivity exchange credits such as converting data associated with a data package plan offered by a cell phone provider for wireless connectivity used in a different medium via the exchange, and so forth. Note that invoice 139 may be sent to one or more billing services for processing and billing. Further, invoice 139 may also be sent to non-billing services for tracking purposes such as earning connectivity exchange credits, and the like.

General Computing Environment

FIG. 10 depicts an example computing environment in which the various technologies described herein may be implemented. Example computing environment 1000 is only one example of a computing system and is not intended to limit the examples described in this application to this particular computing environment. The method for receiving, processing, and generating feature sets and the method for joining a connectivity exchange may be loaded onto a computing device 1001 through the use of computer readable media 1005, 1006 or over a network 1014. Once loaded onto the computing device 1001, the method for receiving, processing, and generating feature sets and the method for joining a connectivity exchange may reside as application programs 1050 and 1051, respectively, on an internal hard disk 1010. When processing, the method for receiving, processing, and generating feature sets and the method for joining a connectivity exchange may also exist as application programs 1055 and 1056, respectively, loaded into system memory 1009.

The computing device 1001 can be implemented with numerous other general purpose or special purpose computing system configurations. Examples of well known computing systems, may include, but are not limited to, personal computers, hand-held or laptop devices, microprocessor-based systems, multiprocessor systems, set top boxes, gaming consoles, consumer electronics, cellular telephones, PDAs, and the like.

Components of computing device 1001 can include one or more processors (including CPUs, GPUs, microprocessors and the like) 1007, a system memory 1009, a system bus 1008 that couples the various system components, and the methods described above. Processor 1007 processes various computer executable instructions, including those to execute and run the methods described in the instant disclosure. For example, processor 1007 processes various computer executable instructions including the method for receiving, processing, and generating feature sets 1050 and/or the method for joining a connectivity exchange 1051 to control the operation of computing device 1001 and to communicate with other electronic and computing devices (not shown). The system bus 1008 represents any number of several types of bus structures, including a memory bus or memory controller, a peripheral bus, an accelerated graphics port, and a processor or local bus using any of a variety of bus architectures.

The system memory 1009 may include computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 1007. The method for receiving, processing, and generating feature sets 1055 and/or the method for joining a connectivity exchange 1056 may be stored in RAM and may be accessible to and/or presently operated on by one or more of the processors 1007.

Peripheral drives 1004 may be coupled to the computing device 1001 or incorporated into the computing device by coupling to the bus. Examples of peripheral drives include mass storage devices such as a magnetic disk drive which reads from and writes to a removable, non-volatile magnetic disk (e.g., a "floppy disk") 1005, or an optical disk drive that reads from and/or writes to a removable, non-volatile optical disk such as a CD-ROM 1006 or the like. Computer readable media such as 1005, 1006 typically embody computer readable instructions, data structures, program modules and the like supplied on floppy disks, CDs, DVDs, portable memory sticks, network attached devices, and the like. The method for receiving, processing, and generating feature sets 1065 and/or the method for joining an connectivity exchange 1066 may be provided to processor 1007 by the peripheral device 1004.

The methods previously described may be disposed on these computer readable media.

Any number of program modules can be stored on hard disk 1010, system memory 1009, or made available via peripheral device 1004 for an operating system, one or more application programs, other program modules, and program data. The method for receiving, processing, and generating feature sets 1050 and/or the method for joining a connectivity exchange 1051 may be stored on the hard disk 1010 or made available through a peripheral drive 1004. Each of such operating system, application programs, other program modules and program data (or some combination thereof) may include an embodiment of the systems and methods described herein.

A display device 1002 can be connected to the system bus 1008 via an interface, such as a video adapter 1011. The display device 1002 displays the method for receiving, processing, and generating feature sets and/or the method for joining a connectivity exchange. A user can interface with computing device 1002 via any number of different input devices 1003 such as a keyboard, pointing device, joystick, game pad, serial port, and/or the like. These and other input devices are connected to the processors 1007 via input/output interfaces 1012 that are coupled to the system bus 1008, but may be connected by other interface and bus structures, such as a parallel port, game port, and/or a universal serial bus (USB).

Computing device 1001 can operate in a networked environment using connections to one or more remote computers through one or more local area networks (LANs), wide area networks (WANs) and the like. The computing device 1001 is connected to a network 1014 via a network adapter 1013 or alternatively by a modem, DSL, ISDN interface or the like.

The storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or a distributed process by executing some software instructions at the local terminal and some at the remote computer (or computer network). It is noted that by utilizing conventional techniques, all, or a portion of the software instructions may be carried out by a dedicated circuit, such as a DSP, programmable logic array, or the like.

Although some particular implementations of systems and methods have been illustrated in the accompanying drawings and described in the foregoing Detailed Description, it will be understood that the system and methods shown and described are not limited to the particular implementations described, but are capable of numerous rearrangements, modifications and substitutions without departing from the spirit set forth and defined by the following claims.

What is claimed is:

1. A method for negotiating rates for wireless connectivity using a connectivity exchange, comprising:
    receiving at the connectivity exchange, a first wireless server provider ("WSP") feature set from a first WSP, the first WSP feature set including one or more attributes, each attribute associated with at least one category, each attribute including at least one value;
    validating, by the connectivity exchange that the first WSP is a member of the connectivity exchange;
    receiving, by the connectivity exchange, a user credential, the user credential associated with a user or an application, wherein the user or the application is associated with a general service provider ("GSP");
    processing, by the connectivity exchange, the first WSP feature set and the user credential;
    generating, by the connectivity exchange, a first message, the first message including the first WSP feature set and the user credential;
    determining, by the connectivity exchange, an appropriate at least one GSP to authenticate the user credential;
    sending, from the connectivity exchange, the first message to the at least one GSP, wherein the at least one GSP is a GSP associated with the user credential or a GSP associated with a user feature set or a GSP determined by the connectivity exchange;
    receiving, at the connectivity exchange, a second message from the at least one GSP, wherein the second message indicates the user credential is valid, the second message comprising one or more of a counter offer message or a request for competing offer message;
    in response to the second message comprising the counter offer message, forwarding the counter offer message to the first WSP; and
    in response to the second message comprising the request for competing offer message, requesting a competing offer from a second WSP.

2. The method of claim 1, wherein the counter offer message comprises a counter offer feature set, the counter offer feature set including one or more attributes, each attribute including at least one value.

3. The method of claim 2, wherein the counter offer feature set includes a counter offer attribute including a binary value.

4. The method of claim 2, wherein the counter offer feature set includes an offer is good until attribute, the offer is good until attribute including a time value.

5. The method of claim 1, further comprising receiving, at the connectivity exchange, a competing offer from the second WSP, the competing offer including a second WSP feature set, the second WSP feature set including one or more attributes, each attribute including at least one value.

6. The method of claim 5, further comprising processing the second WSP feature set by comparing an attribute corresponding to the second WSP feature set to an attribute corresponding to the first WSP feature set.

7. The method of claim 5, further comprising forwarding the second WSP feature set to the at least one GSP.

8. The method of claim 1, further comprising receiving a user feature set associated with a user, the user feature set including one or more attributes, each attribute associated with at least one category, each attribute including at least one value.

9. The method of claim 8, further comprising processing the user feature set, wherein the user feature set includes a membership attribute, the membership attribute including a membership value.

10. The method of claim 9, further comprising determining a GSP associated with the membership value and sending the first message to the at least one GSP, wherein the at least one GSP is the GSP associated with the membership value.

11. The method of claim 1, further comprising determining the GSP associated with the user credential and sending the first message to the at least one GSP, wherein the at least one GSP is the GSP associated with the user credential.

12. A computer readable storage device having stored thereon instructions that upon execution by a computing device cause the computing device to be programmed at least to:
    process a first wireless server provider ("WSP") feature set received at a connectivity exchange, the first WSP feature set received from a first WSP, the first WSP feature set including one or more attributes, each attribute associated with at least one category, each attribute including at least one value;
    validate, by the connectivity exchange, that the first WSP is a member of connectivity exchange;
    process, by the connectivity exchange, a received user credential, the received user credential associated with a user or an application, the user or the application being associated with a general service provider ("GSP");
    process, by the connectivity exchange, the first WSP feature set and the user credential;
    generate, by the connectivity exchange, a first message, the first message including the first WSP feature set and the user credential;
    determine, by the connectivity exchange, an appropriate at least one GSP to authenticate the user credential;
    send, from the connectivity exchange, the first message to the at least one GSP, wherein the at least one GSP is a GSP associated with the user credential or a GSP associated with a user feature set or a GSP determined by the connectivity exchange;
    process, at the connectivity exchange, a second message received from the at least one GSP, wherein the second message indicates the user credential is valid, the second message comprising one or more of a counter offer message or a request for competing offer message;
    in response to the second message comprising the counter offer message, forward the counter offer message to the first WSP; and
    in response to the second message comprising the request for competing offer message, request a competing offer from a second WSP.

13. The computer readable storage device of claim 12, wherein the counter offer message comprises a counter offer feature set, the counter offer feature set including one or more attributes, each attribute including at least one value.

14. The computer readable storage device of claim 13, wherein the counter offer feature set includes a counter offer attribute including a binary value.

15. The computer readable storage device of claim 14, wherein the counter offer feature set includes an offer is good until attribute, the offer is good until attribute including a time value.

16. A system for providing wireless connectivity through a connectivity exchange, comprising:
 a server communicatively coupled to a first wireless service provider ("WSP"), the server comprising one or more memories having stored thereon computer readable instructions that, upon execution by a computing device, cause the system at least to:
  process a first wireless server provider ("WSP") feature set, the first WSP feature set received from a first WSP, the first WSP feature set including one or more attributes, each attribute associated with at least one category, each attribute including at least one value;
  validate that the first WSP is a member of the connectivity exchange;
  receive a user credential, the user credential associated with a user or an application, the user or the application associated with a general service provider ("GSP");
  send a first message to a GSP, wherein the first message comprises the first WSP feature set and the user credential, wherein the GSP is at least one of associated with the user credential or associated with a user feature set comparable to the first WSP feature set;
  process a second message received from the GSP, wherein the second message indicates the user credential is valid, the second message comprising one or more of a counter offer message or a request for competing offer message;
  in response to the second message comprising the counter offer message, forward the counter offer message to the first WSP; and
  in response to the second message comprising the request for competing offer message, request a competing offer from a second WSP.

\* \* \* \* \*